US011934518B2

United States Patent
Tsuchida et al.

(10) Patent No.: US 11,934,518 B2
(45) Date of Patent: Mar. 19, 2024

(54) VERIFICATION APPARATUS, MULTIPARTY COMPUTATION VERIFICATION SYSTEM, AND METHOD AND PROGRAM FOR VERIFYING MULTIPARTY COMPUTATION EXECUTABLE CODE

(71) Applicant: NEC Corporation, Tokyo (JP)

(72) Inventors: Hikaru Tsuchida, Tokyo (JP); Takao Takenouchi, Tokyo (JP); Toshinori Araki, Tokyo (JP); Kazuma Ohara, Tokyo (JP); Takuma Amada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 441 days.

(21) Appl. No.: 17/420,949

(22) PCT Filed: Jan. 9, 2019

(86) PCT No.: PCT/JP2019/000374
§ 371 (c)(1),
(2) Date: Jul. 6, 2021

(87) PCT Pub. No.: WO2020/144768
PCT Pub. Date: Jul. 16, 2020

(65) Prior Publication Data
US 2022/0092172 A1    Mar. 24, 2022

(51) Int. Cl.
*G06F 21/54*    (2013.01)
*G06F 8/41*    (2018.01)
(Continued)

(52) U.S. Cl.
CPC ............. *G06F 21/54* (2013.01); *G06F 8/41* (2013.01); *G06F 11/3404* (2013.01); *G06F 21/554* (2013.01)

(58) Field of Classification Search
USPC .......................................................... 726/26
See application file for complete search history.

(56) References Cited

U.S. PATENT DOCUMENTS

| 5,598,561 A | 1/1997 | Funaki |
| 2002/0104076 A1 | 8/2002 | Shaylor |

(Continued)

FOREIGN PATENT DOCUMENTS

| JP | H05035772 A | 2/1993 |
| JP | H10229398 A | 8/1998 |

(Continued)

OTHER PUBLICATIONS

Zhang, Yihua, Aaron Steele, and Marina Blanton. "PICCO: a general-purpose compiler for private distributed computation." Proceedings of the 2013 ACM SIGSAC conference on Computer & communications security. 2013. (Year: 2013).*

(Continued)

*Primary Examiner* — Sanchit K Sarker
(74) *Attorney, Agent, or Firm* — Sughrue Mion, PLLC

(57) ABSTRACT

A verification apparatus acquires a source code for multiparty computation, while changing a combination of options settable to a multiparty computation compiler, compiles the source code for each combination of options to generate a plurality of multiparty computation executable codes, selects at least one multiparty computation executable code from the plurality of multiparty computation executable codes as a verification code and provides the at least one verification code to a verification environment of multiparty computation, generates an evaluation index with respect to an execution result of at least one verification code in the verification environment, and selects at least one recommended code from the plurality of multiparty computation executable codes, based on the evaluation index correspond- (Continued)

ing to at least one verification code and outputs the selected recommended code.

19 Claims, 20 Drawing Sheets

(51) Int. Cl.
*G06F 11/34* (2006.01)
*G06F 21/55* (2013.01)

(56) References Cited

U.S. PATENT DOCUMENTS

| | | | | |
|---|---|---|---|---|
| 2008/0046865 | A1* | 2/2008 | Kerschbaum | G06F 21/556 717/106 |
| 2008/0104699 | A1* | 5/2008 | Gounares | G06F 9/468 726/25 |
| 2014/0130173 | A1* | 5/2014 | Kerschbaum | G06F 21/10 726/26 |
| 2014/0372769 | A1* | 12/2014 | Kerschbaum | H04L 9/008 713/189 |
| 2016/0188873 | A1* | 6/2016 | Smith | G06F 21/53 726/22 |
| 2017/0123773 | A1* | 5/2017 | Gao | G06F 8/443 |
| 2018/0115415 | A1 | 4/2018 | Teranishi | |
| 2018/0139045 | A1 | 5/2018 | Furukawa et al. | |
| 2021/0049600 | A1* | 2/2021 | Spector | H04L 9/085 |

FOREIGN PATENT DOCUMENTS

| | | |
|---|---|---|
| JP | 2000040007 A | 2/2000 |
| JP | 2006277053 A | 10/2006 |
| JP | 2018045019 A | 3/2018 |
| WO | 2016159357 A1 | 10/2016 |
| WO | 2016178291 A1 | 11/2016 |

OTHER PUBLICATIONS

International Search Report for PCT Application No. PCT/JP2019/000374, dated Mar. 26, 2019.
"Scale-Mamba Software", Dec. 11, 2018, pp. 1-3, [Online] <URL: https://homes.esat.kuleuven.be/~nsmart/SCALE/>, retrieval date Jan. 8, 2019.
NEC Corporation Research & Development,, Nov. 5, 2018, pp. 1-5, [online] <URL:https://www.nec.com/en/global/rd/technologies/201805/index.html>, retrieval date Feb. 27, 2019.
Aomine Ryoko, "System for developing language processing apparatus", Toshiba Corporation, Toshiba's Technology Disclosure Paper, Publication: No. 2002-0702, Ref. No. AB02025346, Proposal No. 46B018083, ISSN 0288-2701, vol. 2016, Mar. 28, 2002, pp. 121-136.

* cited by examiner

FIG. 4

| COMMUNICATION ENVIRONMENT PARAMETERS | | |
|---|---|---|
| PATH | COMMUNICATION BANDWIDTH | COMMUNICATION LATENCY |
| SERVERS 10-1, 10-2 | 10Mbps | 100ms |
| SERVERS 10-1, 10-3 | 100Mbps | 10ms |
| SERVERS 10-2, 10-3 | 100Mbps | 10ms |

FIG. 6

COMPILE OPTION LIST

| OPTION NAME | VALUE | NOTE |
|---|---|---|
| CODE SIZE | 0 | CODE SIZE NOT-PRIORITIZED |
| CODE SIZE | 1 | CODE SIZE PRIORITIZED |
| TYPE CONVERSION | 0 | NUMBER OF PROCESSED CASES PER UNIT TIME PRIORITIZED |
| TYPE CONVERSION | 1 | RESPONSE TIME IN A SINGLE PROCESS PRIORITIZED |
| ... | ... | ... |

FIG. 7

| VERIFICATION CODE | THROUGHPUT | OPTION COMBINATION |
|---|---|---|
| CODE 1 | 50 | CODE SIZE = 0, TYPE CONVERSION = 0, ... |
| CODE 2 | 150 | CODE SIZE = 1, TYPE CONVERSION = 0, ... |
| CODE 3 | 200 | CODE SIZE = 0, TYPE CONVERSION = 1, ... |
| ... | ... | ... |

FIG. 11

| VERIFICATION ENVIRONMENT | VERIFICATION CODE | THROUGHPUT |
|---|---|---|
| VERIFICATION ENVIRONMENT 40-1 | CODE 11 | 200 CASES |
| VERIFICATION ENVIRONMENT 40-2 | CODE 21 | 300 CASES |
| VERIFICATION ENVIRONMENT 40-3 | NONE | 50 CASES |
| ... | ... | ... |

FIG. 15

```
1   /* main */
2   num_input = 1000
3   input_values = Array (num_input)
4   for i in range(num_input):
5       input_values[i]=get_input
6   
7   result = mean(input_values, num_input)
8   print_ln(' mean=%s' ¥n, result)
9   
10  /* function */
11  def mean (value, num):
12      int sum
13      for i in range (num):
14          sum = sum + 10*value[i]
15      mean = sum/num
16      return mean
```

FIG. 16A

SETTING INFORMATION

| DATA INPUT FORMAT | RECEIVED BY REPRESENTATIVE SERVER; REPRESENTATIVE SERVER = 10-1 |
|---|---|
| DATA RECONSTRUCTION ENTITY | RECONSTRUCTED BY REPRESENTATIVE SERVER; REPRESENTATIVE SERVER = 10-1 |

FIG. 16B

| get_input | get_input_from() |
|---|---|
| ... | ... |

FIG. 16C

| print_ln(-, result) | print_ln(-, result.reveal()) |
|---|---|
| ... | ... |

FIG. 16D

| SECRET SHARING OF PARAMETERS | MINIMUM |
|---|---|

FIG. 16E

| TYPE NOT EXPLICITLY SPECIFIED | INTEGER |
|---|---|
| DIVISION RESULT | FIXED-POINT |

FIG. 17

```
1   /* main */
2   num_input = 1000
3   input_values = Array (num_input, sint)
4   for i in range(num_input):
5       input_values[i]=sint.get_input_from(1)
6   
7   result = mean(input_values, num_input)
8   print_ln('mean=%s'¥n, result.reveal(1))
9   
10  /* function */
11  def mean (value, num):
12      sum=sint(0)
13      for i in range (num):
14          sum = sum + 10*value[i]
15  
16      Sf=sfix(0)
17      Sf.load_int(sum)
18      Nf=sfix(0)
19      Nf.load_int(num)
20      mean = Sf/Nf
21      return mean
```

FIG. 18

```
1   /* main */
2   num_input = sint(1000)
3   input_values = Array (num_input, sint)
4   for i in range(num_input):
5       input_values[i]=sint.get_input_from(1)
6
7   result = mean(input_values, num_input)
8   print_ln(' mean=%s ' \n, result.reveal(1))
9
10  /* function */
11  def mean (value, num):
12      sum=sint(0)
13      p1=sint(10)
14      for i in range (num):
15          sum = sum + p1*value[i]
16
17      Sf=sfix(0)
18      Sf.load_int(sum)
19      Nf=sfix(0)
20      Nf.load_int(num)
21      mean = Sf/Nf
22      return mean
```

VERIFICATION APPARATUS, MULTIPARTY COMPUTATION VERIFICATION SYSTEM, AND METHOD AND PROGRAM FOR VERIFYING MULTIPARTY COMPUTATION EXECUTABLE CODE

This application is a National Stage Entry of PCT/JP2019/000374 filed on Jan. 9, 2019, the contents of all of which are incorporated herein by reference, in their entirety.

FIELD

The present invention relates to a verification apparatus, multiparty computation verification system, and method and non-transitory medium storing a program for verifying multiparty computation executable code.

BACKGROUND

There is a technique called Multi Party Computation (MPC) (for example, refer to Patent Literature (PTL) 1). In multiparty computation (secret sharing computation), a plurality of parties (secure computation servers) performs various computations using secret information while hiding the secret information possessed by each party.

The secure computation servers execute predetermined processing in cooperation with each other. In order to perform multiparty computation, each secure computation server must receive a multiparty computation executable code (bytecode). It is noted that "bytecode" or "code" herein denotes multiparty computation executable code when there is no special explanation.

For example, a bytecode is generated by providing a source code to a multiparty computation compiler disclosed in Non-Patent Literature 1. By executing the compiler, one can obtain a bytecode to be fed (delivered) to each secure computation server.

Further, when executing multiparty computation, the secure computation servers communicate with each other. In this case, the communication cost is often evaluated with a communication amount (size of data transmitted and received between servers) and the number of communication rounds (the number of communications between servers). This communication cost varies according to bytecode executed by each secure computation server. More specifically, even if the same source code is fed to the multiparty computation compiler, different options given to the compiler would generate different bytecodes, and the communication cost will be different for each generated byte code.
PTL1: Japanese Patent Kokai Publication No. JP-P2018-045019A
NPL1: "SCALE-MAMBA Software," Dec. 11, 2018, [online], [searched on Dec. 11, 2018], the Internet <URL: https://homes.esat.kuleuven.be/~nsmart/SCALE/>

SUMMARY

Each disclosure of Patent Literature 1 and Non-Patent Literature 1 cited above is incorporated herein in its entirety by reference thereto. The following analysis is given by the present inventors.

As described above, even if the same source code is provided to a multiparty computation compiler, the generated bytecode varies depending on specified compile options. Different bytecodes have different communication costs. An environment in which a user tries to achieve a predetermined service or application using multiparty computation (environment in which a secure computation server is provided) varies widely. That is, communication characteristics (such as communication bandwidth, and latency) between individual servers depend on the user environment.

If communication characteristics of a user environment are different, an optimum bytecode for executing multiparty computation in the environment will also be different. More specifically, in terms of communication characteristics, optimal bytecodes are normally different, between a user environment with a good communication bandwidth and one with favorable (small) latency. If a bytecode suitable for each user environment is not used, the user may not be able to achieve multiparty computation performance which the user wants.

Therefore, a bytecode suitable for the user environment is desirable, but it is not easy to generate such bytecode. As described above, by changing the options set to the multiparty computation compiler, bytecodes with different capabilities can be obtained. Choosing these options, however, requires specialized knowledge of multiparty computation, and it is difficult for an ordinary user even to select an option optimal to some extent.

A multiparty computation expert is able to deduce optimum options from characteristics of a communication path in a user execution environment (for example, communication bandwidth, and latency) to some extent. Even an expert, however, cannot accurately determine whether or not an option is truly optimal without executing a bytecode in each environment. For example, if a condition that differs is only that a communication bandwidth is "narrow" or "wide" and other conditions match, then the difference between an expected optimal bytecode and a bytecode truly optimal is likely to be small. Communication bandwidth and communication latency, however, often change together. Therefore, for example, depending on a degree of parallelism in parallel processing, favorability of bytecodes may be reversed in a certain degree of parallelism. It is difficult to verify a degree of parallelism that causes such a reversal without executing a bytecode in the real environment.

As described above, it is difficult for even a multiparty computation expert to choose a compile option for generating a bytecode optimal for a user environment, depending on communication path characteristics or multiparty computation contents.

It is a main object of the present invention to provide a verification apparatus, multiparty computation verification system, and method and non-transitory medium storing a program for verifying multiparty computation executable code that contribute to recommending a bytecode (multiparty computation executable code) suitable for a user environment.

According to a first aspect of the present invention or disclosure, there is provided a verification apparatus including an acquisition part that acquires a source code for multiparty computation; a compilation part that while changing a combination of options settable to a multiparty computation compiler, compiles the source code for each combination of options to generate a plurality of multiparty computation executable codes; a verification environment control part that selects at least one multiparty computation executable code from the plurality of multiparty computation executable codes as a verification code and provides the at least one verification code to a verification environment of multiparty computation; an evaluation part that generates an evaluation index with respect to an execution result of the at least one verification code in the verification environment; and an output part that selects at least one recommended code from the plurality of multiparty computation executable codes, based on the evaluation index corresponding to the at least one verification code and outputs the selected recommended code.

According to a second aspect of the present invention or disclosure, there is provided a multiparty computation verification system including a verification environment including a plurality of secure computation servers and a verification apparatus connected to the verification environment, and the verification apparatus includes an acquisition part that acquires a source code for multiparty computation; a compilation part that while changing a combination of options settable to a multiparty computation compiler compiles the source code for each combination of options to generate a plurality of multiparty computation executable codes; a verification environment control part that selects at least one multiparty computation executable code from the plurality of multiparty computation executable codes as a verification code and provides the at least one verification code to the verification environment; an evaluation part that generates an evaluation index with respect to an execution result of the at least one verification code in the verification environment; and an output part that selects at least one recommended code from the plurality of multiparty computation executable codes, based on the evaluation index corresponding to the at least one verification code and outputs the selected recommended code.

According to a third aspect of the present invention or disclosure, there is provided a method for verifying multiparty computation executable code including:
acquiring a source code for multiparty computation;
while changing a combination of options settable to a multiparty computation compiler, compiling the source code for each combination of options to generate a plurality of multiparty computation executable codes;
selecting at least one multiparty computation executable code from the plurality of multiparty computation executable codes as a verification code and providing the at least one verification code to a verification environment of multiparty computation;
generating an evaluation index with respect to an execution result of the at least one verification code in the verification environment; and
selecting at least one recommended code from the plurality of multiparty computation executable codes, based on the evaluation index corresponding to the at least one verification code and outputting the selected recommended code.

According to a fourth aspect of the present invention or disclosure, there is provided a program executing processing including:
acquiring a source code for multiparty computation;
while changing a combination of options settable to a multiparty computation compiler, compiling the source code for each combination of options to generate a plurality of multiparty computation executable codes;
selecting at least one multiparty computation executable code from the plurality of multiparty computation executable codes as a verification code and providing the at least one verification code to a verification environment of multiparty computation;
generating an evaluation index with respect to an execution result of the at least one verification code in the verification environment; and selecting at least one recommended code from the plurality of multiparty computation executable codes, based on the evaluation index corresponding to the at least one verification code and outputting the selected recommended code.

The above program may be stored in a computer-readable storage medium. The storage medium may be non-transient one such as a semiconductor memory, a hard disk, a magnetic recording medium, an optical recording medium, and the like. The present invention can be realized as a computer program product.

According to each aspect of the present invention or disclosure, there is provided a verification apparatus, multiparty computation verification system, and method and program for verifying multiparty computation executable code that contribute to recommending a bytecode (multiparty computation executable code) suitable for a user environment.

BRIEF DESCRIPTION OF THE DRAWINGS

FIG. 4 is a diagram illustrating an example of communication environment parameters.

FIG. 6 is a diagram illustrating an example of a compile option list.

FIG. 7 is a diagram illustrating an example of verification codes and the results of evaluation indices.

FIG. 11 is a diagram illustrating an example of a verification code and an evaluation index result for each verification environment.

FIG. 15 is an example of source code received by the verification apparatus according to the sixth example embodiment.

FIGS. 16A, 16B, 16C, 16D, and 16E are drawings showing examples of setting information referred to by a conversion part according to the sixth example embodiment.

FIG. 17 is a diagram illustrating an example of a dedicated secure computation code.

FIG. 18 is a diagram illustrating an example of a dedicated secure computation code.

DETAILED DESCRIPTION

Figure 1:
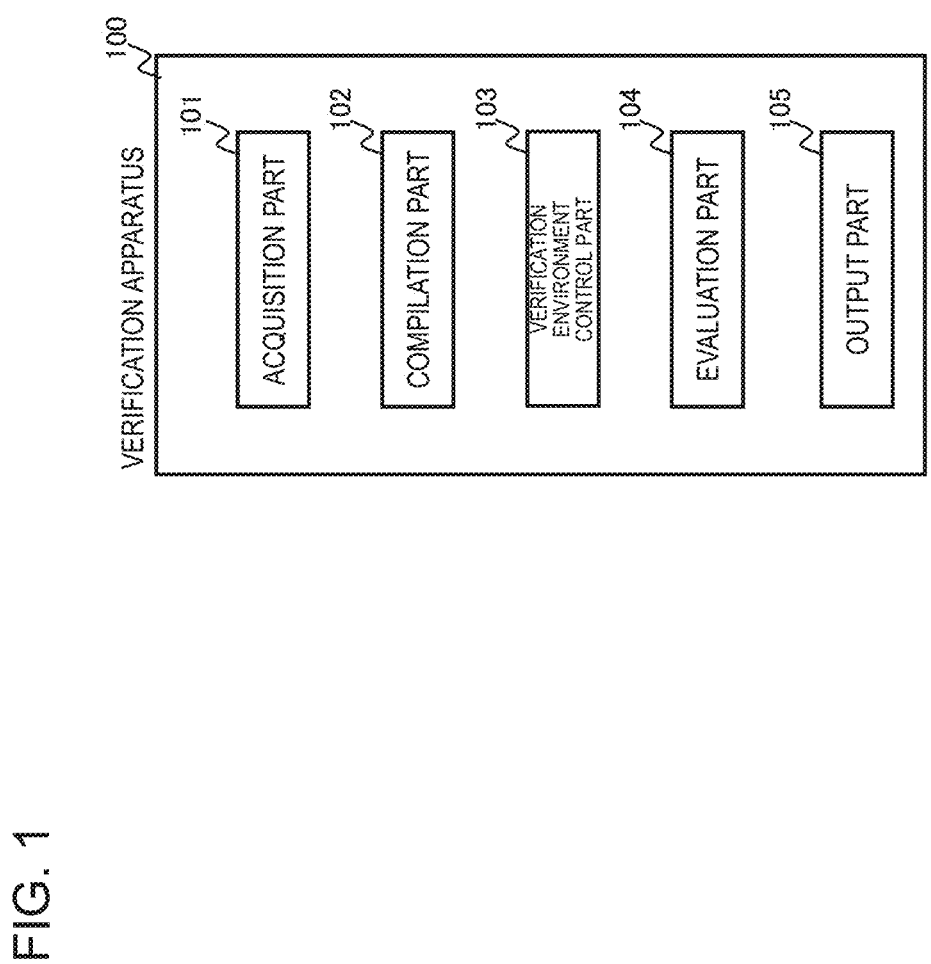
FIG. 1 is a drawing for explaining an outline of an example embodiment.

First, an outline of an example embodiment of the present invention will be given. It should be noted that the drawing reference signs in the outline are given to each element for convenience as an example to facilitate understanding, and the description in the outline is not intended to limit the present invention. Further, connection lines between blocks in each drawing can be both bidirectional and unidirectional. A unidirectional arrow schematically shows the main flow of a signal (data) and does not exclude bidirectionality. Further, in circuit diagrams, block diagrams, internal configuration diagrams, and connection diagrams illustrated in the disclosure of the present application, the input and output ends of each connection line have an input port and an output port, respectively, although not shown explicitly. The same applies to input/output interfaces.

A verification apparatus 100 relating to an example embodiment comprises an acquisition part 101, a compilation part 102, a verification environment control part 103, an evaluation part 104, and an output part 105 (refer to FIG. 1). The acquisition part 101 acquires a source code for multiparty computation. The compilation part 102 compiles the source code for each combination of options settable for a multiparty computation compiler while changing the combinations and generates a plurality of multiparty computation executable codes. The verification environment control part 103 selects at least one multiparty computation executable code from the plurality of multiparty computation executable codes as a verification code and provides the at least one verification code to a verification environment of multiparty computation. The evaluation part 104 generates an evaluation index with respect to an execution result of at least one verification code in the verification environment. The output part 105 selects at least one recommended code from the plurality of multiparty computation executable codes, based on the evaluation index corresponding to at least one verification code and outputs the selected recommended code.

The verification apparatus 100 obtains a source code for multiparty computation from a user and generates a plurality of bytecodes by changing combinations of compile options while compiling the source code. The verification apparatus 100 has a verification environment simulating the user environment execute each of the plurality of generated bytecodes. The verification apparatus 100 evaluates the result of executing each verification code in the verification environment and provides a verification code suitable for the user environment as a recommended code to the user. As a result, it becomes possible to select a bytecode suitable for the user environment from a plurality of bytecodes generatable from combinations of compile options and provide the selected bytecode to the user. That is, a bytecode (multiparty computation executable code) suitable for the user environment can be recommended to the user.

Specific example embodiments will be described in more detail with reference to the drawings. Note that the same reference signs are given to the same elements in each example embodiment, and the description thereof will be omitted.

[First Example Embodiment]

A first example embodiment will be described in detail with reference to the drawings.

Figure 2:
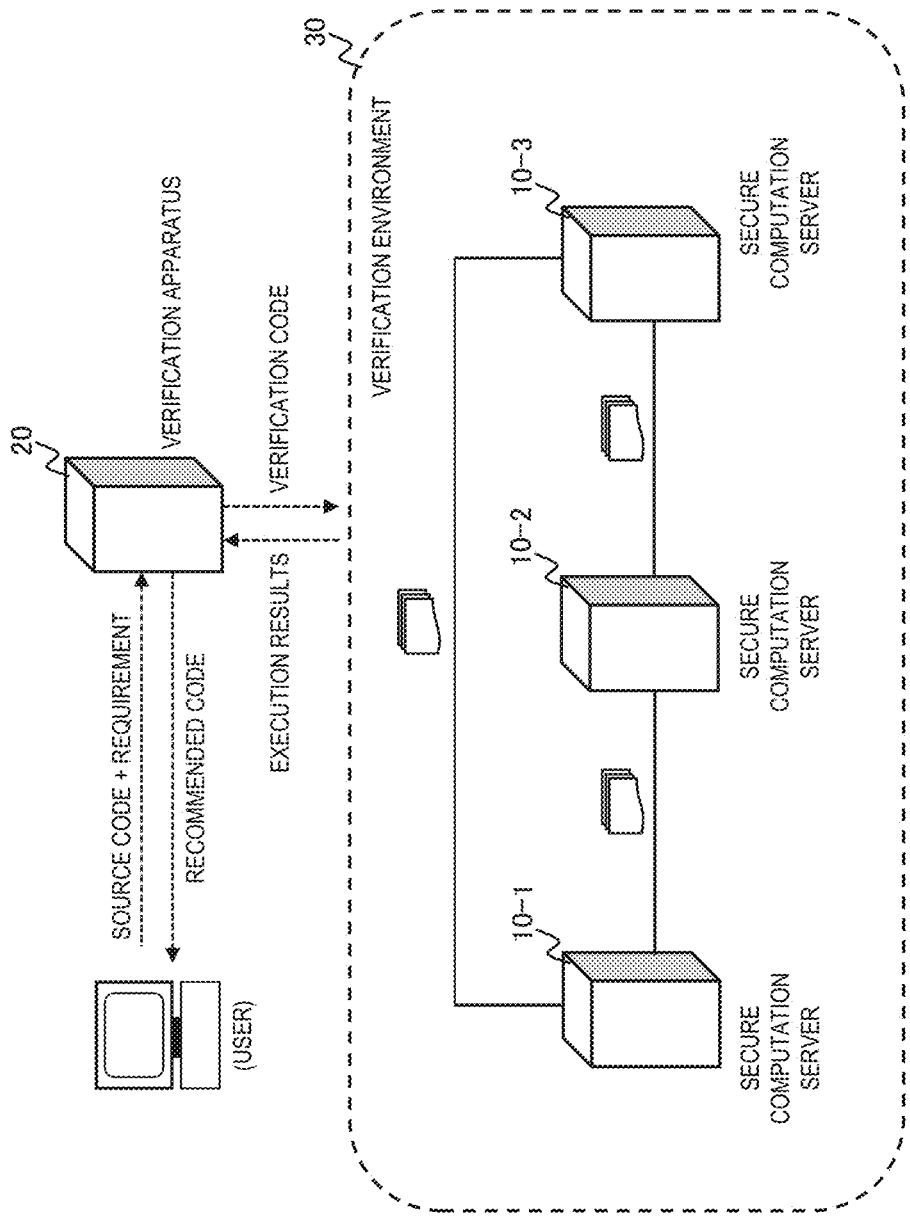
FIG. 2 is a diagram illustrating an example of a schematic configuration of a multiparty computation verification system relating to a first example embodiment.

FIG. 2 is a diagram illustrating an example of a schematic configuration of a multiparty computation verification system relating to a first example embodiment. Referring to FIG. 2, the multiparty computation verification system is configured to include a plurality of secure computation servers 10-1 to 10-3 and a verification apparatus 20. The secure computation servers 10-1 to 10-3, which constitute a verification environment 30, is connected to the verification apparatus 20. In the following description, the secure computation servers 10-1 to 10-3 will be simply referred to as the "secure computation servers 10" unless there is a special reason to distinguish between them.

The following describes the first example embodiment assuming that a secure computation method by means of multiparty computation as disclosed in PTL 1 is used. Therefore, the multiparty computation verification system should include at least two secure computation servers 10. Further, the system configuration illustrated in FIG. 2 is only a non-limiting example where the number of the secure computation servers 10 is not limited to that illustrated.

The secure computation servers 10 execute multiparty computation. The secure computation servers 10 obtain data required to execute multiparty computation from the verification apparatus 20. More specifically, the secure computation servers 10 acquire from the verification apparatus 20 a bytecode for achieving predetermined multiparty computation (multiparty computation executable code; code in which a multiparty computation circuit is described).

The following description assumes that data necessary for executing multiparty computation (input data, secret sharing data) are included within a bytecode. When input data are not included in a bytecode, the verification apparatus 20 provides the input data to the secure computation servers 10 along with the bytecode.

The secure computation servers 10 execute predetermined multiparty computation in cooperation with each other. Out of the three secure computation servers 10, one secure computation server 10 transmits an execution result of multiparty computation to the verification apparatus 20.

As for the execution result of the secure computation servers 10, various formats can be conceivable depending on contents of the multiparty computation executed. For example, in a statistical computation using a set of input data, a "statistical value" that is a computation result is the execution result. Alternatively, when the same process is repeatedly applied to a plurality of input sets, the fact that the process with respect to an input set has been completed corresponds to the execution result. For example, a notification that processing for a query in an RDB (Relational Database) has been completed corresponds to the execution result.

The verification apparatus 20 obtains a source code describing multiparty computation processing and a user requirements specification with respect to multiparty computation (simply referred to as "requirements specification" hereinafter). As described above, a multiparty computation compiler is used to generate a bytecode, and source code processable by the multiparty computation compiler is one created for multiparty computation (referred to as "dedicated multiparty computation source code" hereinafter).

The multiparty computation compiler is not able to generate a bytecode (multiparty computation executable code) directly from a source code written in a general-purpose language such as C language and Python. A source code written in C language or the like requires predetermined conversion and editing work. In the first example embodiment, a user enters a source code processable by the multiparty computation compiler (dedicated multiparty computation source code) to the verification apparatus 20, as a "source code for multiparty computation."

The requirements specification obtained by the verification apparatus 20 includes various requests for multiparty computation from a user. In the first example embodiment, the requirements specification includes information regarding a network in an environment in which multiparty computation is executed (hereinafter referred to as "user environment"). More specifically, the information defining the network in a user environment may include the number of servers executing multiparty computation, characteristics of communication lines between the servers (communication bandwidth, communication latency, etc.), and communication channel configuration (bi-directional communication enabled, one-way communication, dedicated line, etc.).

Using the information (the requirements specification) regarding the network, the verification apparatus 20 simulates a user environment in which multiparty computation is executed. Then the verification apparatus 20 evaluates a bytecode in the simulated user environment, and based on a result of the evaluation, the verification apparatus 20 provides the user with the most suitable code for the user environment (a user's network configuration in which multiparty computation is expected to be executed) as a "recommended code." Note that simulating an environment in which multiparty computation is executed, indicates simulating quantifiable characteristics with respect to the environment in which multiparty computation is executed (for example, the number of secure computation servers used and communication characteristics between the servers) in another environment.

Here, when compiling the acquired source code, the verification apparatus 20 varies options settable in the compiler and generates a plurality of bytecodes. Since the plurality of bytecodes are generated from the same source code, as a basis thereof, they will produce the same multiparty computation result. However, since each of the generated bytecodes has a different set of options set in the compiler, they have different communication costs (communication amount between the servers, the number of communication rounds). With different communication costs, performance of the multiparty computation realized by each bytecode, i.e., processed data amount per unit time (throughput) and a response time (latency), will be different.

The verification apparatus 20 selects one bytecode from a plurality of the generated bytecodes and provides the selected code to each secure computation server 10 as a "verification code."

The secure computation servers 10 execute multiparty computation using the acquired verification code and outputs the execution result to the verification apparatus 20. The verification apparatus 20 and the secure computation servers 10 repeat this process (of providing a verification code and outputting the execution result) for each of a plurality of the generated bytecodes.

The verification apparatus 20 evaluates each bytecode using the acquired execution result and provides an optimal bytecode for the user environment as a "recommended code." For example, the verification apparatus 20 outputs a bytecode with good performance executable in a user environment, in which the user is planning to execute multiparty computation, as a "recommended code."

Alternatively, the verification apparatus 20 may output a plurality of bytecodes as "recommended codes." Specifically, the verification apparatus 20 may select a verification code corresponding to an evaluation index indicating a best performance among evaluation indices with respect to the execution results of a plurality of verification codes. Alternatively, the verification apparatus 20 may perform threshold processing on a plurality of evaluation indices to select verification codes corresponding to evaluation indices indicating a predetermined performance level or higher, as "recommended codes."

Further, when a recommended code is provided, in addition to the bytecode (binary data), information that can generate the recommended code (for example, a compiler type, a version, and selected compile options) is also provided.

As described above, the verification apparatus 20 utilizes a plurality of the secure computation servers 10, as a "verification environment" for evaluating each of a plurality of generated bytecodes. That is, the verification environment 30 can be said to be an environment for evaluating a performance of a bytecode (multiparty computation circuit) generated by the verification apparatus 20.

The verification apparatus 20 generates "communication environment parameters" for simulating the user environment using the information included in the requirements specification and constructs the verification environment 30 by setting the parameters in the secure computation servers 10. That is, the communication environment parameters are information for simulating the user environment and include information regarding, for example, a communication bandwidth and a latency between the servers.

Next, each apparatus included in the multiparty computation verification system will be described.

[Secure Computation Server]

Figure 3:
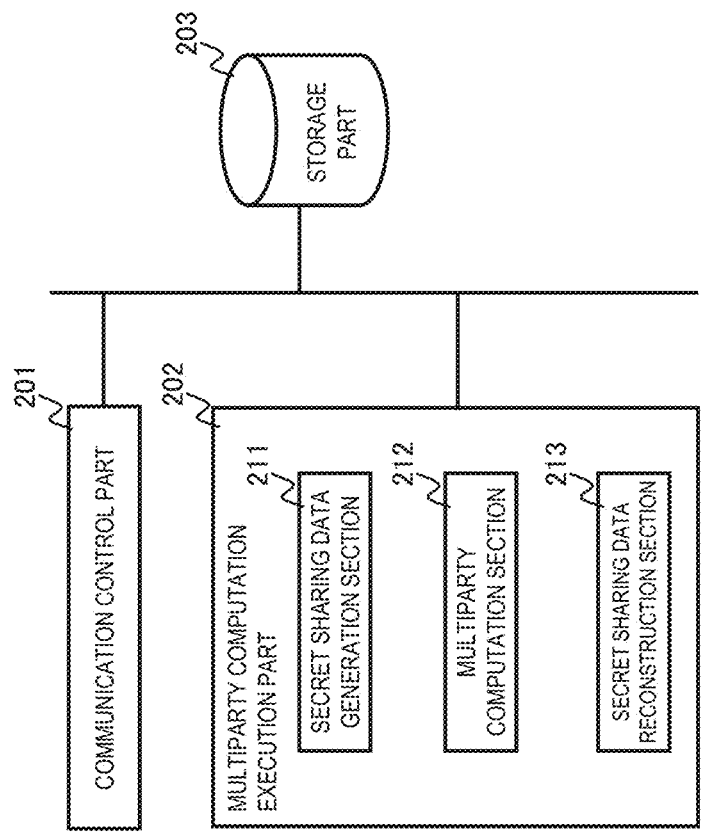
FIG. 3 is a diagram illustrating an example of a processing configuration of a secure computation server according to the first example embodiment.

FIG. 3 is a diagram illustrating an example of a processing configuration (processing modules) of the secure computation server 10 according to the first example embodiment. Referring to FIG. 3, the secure computation server 10 is configured to include a communication control part 201, a multiparty computation execution part 202, and a storage part 203.

The communication control part 201 is means for controlling communication with another apparatus. The communication control part 201 stores a verification code obtained from the verification apparatus 20 in the storage part 203. The communication control part 201 transmits data (for example, data for completing a multiplication process) generated by the multiparty computation execution part 202 to other secure computation servers 10.

The communication control part 201 acquires the communication environment parameters from the verification apparatus 20. Using the communication environment parameters, the communication control part 201 simulates an environment (user environment) in which the user plans to execute multiparty computation.

For example, let's assume that communication environment parameters as illustrated in FIG. 4 are provided to the secure computation server 10. In this case, the secure computation server 10-1 sets a bandwidth of communication with the secure computation server 10-2 to 10 Mbps (megabits per second) and the latency to 100 ms (milliseconds). Further, the secure computation server 10-1 sets a bandwidth of communication with the secure computation server 10-3 to 100 Mbps and the latency to 10 ms.

It is assumed that communication paths between the secure computation servers 10 originally have very high capacities (ideal characteristics). By limiting the communication paths with ideal characteristics to the characteristics specified by the communication environment parameters, the communication control part 201 of each secure computation server 10 simulates an environment in which the user plans to execute multiparty computation.

The simulation (limitation) of the communication bandwidth may be achieved by utilizing hardware such as an NIC (Network Interface Card) or software. For example, when hardware is used, a communication bandwidth rate (10 Mbps, 100 Mbps, etc.) may be selected and set in the NIC according to the communication environment parameters. Likewise, the simulation of the communication latency may be achieved utilizing hardware or software. For example, by adjusting a time interval between transmissions one a piece of data and the next, the "communication latency" specified in the communication environment parameters may be achieved.

Further, when "one-way communication," is set as a communication environment parameter, a secure computation server 10 that acquired this parameter may stop transmitting data to a target secure computation server 10. Alternatively, when "dedicated line," is sent as a communication environment parameter, a secure computation server 10 that acquired this parameter may simulate a "dedicated line" by setting the original ideal characteristics non-restrictive.

Referring to FIG. 3 again, the multiparty computation execution part 202 executes multiparty computation. The multiparty computation execution part 202 executes multiparty computation using a bytecode (verification code) stored in the storage part 203.

In addition to the bytecode, the storage part 203 stores various types of information. More specifically, the storage part 203 stores information indicating as what number of "party" the server itself operates and information regarding other secure computation servers (other parties) (for example, IP (Internet Protocol) address, etc.).

The multiparty computation execution part 202 performs multiparty computation using the information stored in the storage part 203. The multiparty computation execution part 202 includes a submodule constituted by a secret sharing data generation section 211, a multiparty computation section 212, and a secret sharing data reconstruction section 213.

The secret sharing data generation section 211 is a module that operates when an executable code for secret sharing states that the server itself performs secret sharing on input data and distributes shares to other servers. The secret sharing data generation section 211 of the secure computation server 10 with a party number (identifier) matching the one specified in the secret sharing executable code performs secret sharing on input data and distributes secret information (share information) to the other secure computation servers 10.

The multiparty computation section 212 executes bytecode. In multiparty computation utilizing secret sharing, each party locally performs closed computation within itself with respect to addition (subtraction) of share information. On the other hand, with respect to a multiplication (division) of share information, each server proceeds processing by transmitting a computation result thereof to other secure computation servers 10.

The secret sharing data reconstruction section 213 is a module that operates when a secret sharing executable code states that the server itself reconstructs a computation result. The secret sharing data reconstruction section 213 of the secure computation server 10 with a party number matching the one specified in the secret sharing executable code collects computation results distributed among the servers and reconstructs the computation result. The secret sharing data reconstruction section 213 transmits the reconstructed computation result to the verification apparatus 20.

[Verification Apparatus]

Figure 5:
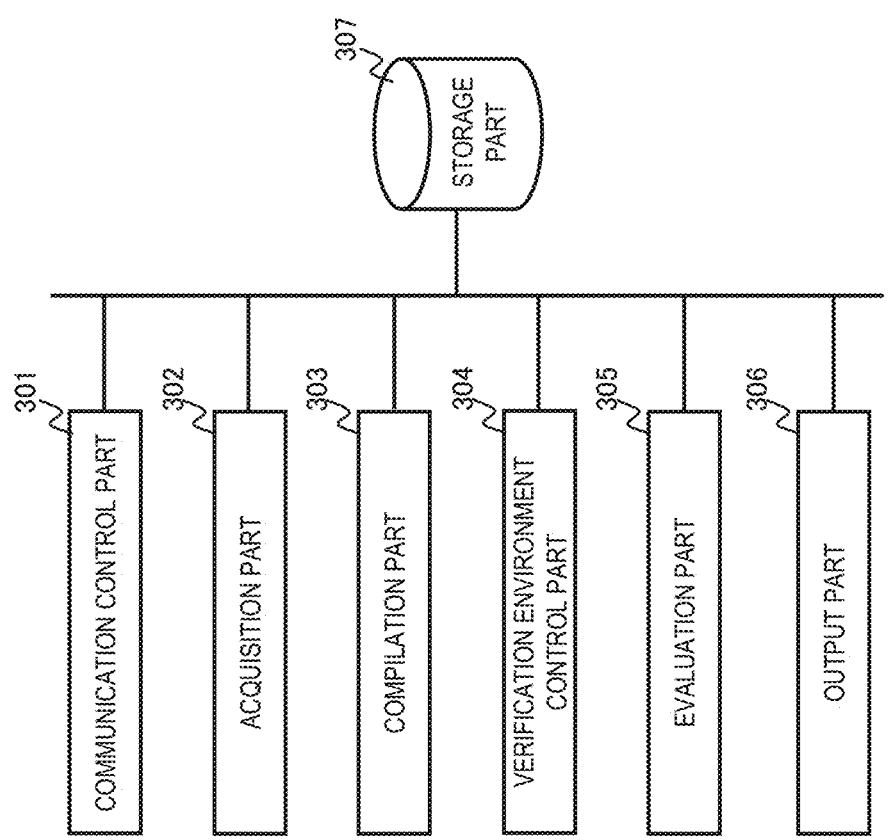
FIG. 5 is a diagram illustrating an example of a processing configuration of a verification apparatus according to the first example embodiment.

FIG. 5 is a diagram illustrating an example of a processing configuration (processing modules) of the verification apparatus 20 according to the first example embodiment. Referring to FIG. 5, the verification apparatus 20 is configured to include a communication control part 301, an acquisition part 302, a compilation part 303, a verification environment control part 304, an evaluation part 305, an output part 306, and a storage part 307.

The communication control part 301 controls communication with another apparatus (the secure computation server 10).

The acquisition part 302 generates a GUI (Graphical User Interface) for the user to enter a source code and a requirements specification. The acquisition part 302 stores the acquired source code and requirements specification in the storage part 307.

For example, the compilation part 303 is realized by the program disclosed in NPL 1. The compilation part 303 compiles the source code for each combination of options while changing the combination of options settable for the secret calculation compiler to generate a plurality of multiparty computation executable codes (bytecodes).

More specifically, the compilation part 303 refers to a compile option list stored in advance in the storage part 307 and compiles the source code while changing options used to cover a combinations of compilation options described in the list. Note that the verification apparatus 20 may access a database server storing the compile option list to obtain it.

FIG. 6 is a diagram illustrating an example of the compile option list. As illustrated in FIG. 6, options settable for a compiler are listed therein.

For example, the compile options include an option for "code size" as illustrated in FIG. 6, and when this option is made effective, a bytecode with a small size is generated. Further, an option for "type conversion" is also provided. In multiparty computation, there is a "type conversion process" called bit decomposition. Options of prioritizing the number of processed cases per unit time or a response time for a single process during a bit decomposition process are given.

It is noted that the compile options illustrated in FIG. 6 are only non-limiting examples and there are many more options. For example, there are "option for fixed (floating) point accuracy" and "option for security". Note that the option for security determine whether or not a fraud detection is be enabled.

Alternatively, the compile options may include a selection of a multiparty computation method itself that is to be used. In this case, a compile option list for a first multiparty computation method and a compile option list for a second multiparty computation method may be provided. For example, in the first multiparty computation method, when shares (secret sharing information) distributed to parties participating in multiparty computation are generated from secret information S, a modulus N (N is a natural number; the same applies hereinafter) is the power of 2. In the second multiparty computation method, the modulus N is a prime number.

The compilation part 303 hands over the plurality of bytecodes generated by compiling the source code to the verification environment control part 304.

Since the compilation part 303 can be realized by the program disclosed in NPL 1 As described above, a detailed explanation thereof will be omitted. The following is an outline of the processing performed by the compilation part 303.

In multiparty computation, a secure computation server 10 needs to communicate with another secure computation server 10 to complete multiplication. Communication among the secure computation servers 10 causes speed lowering of multiparty computation. The compilation part 303 generates bytecode so that the number of the communications is kept to a minimum. More specifically, the compilation part 303 performs processing such as changing an order of multiplications in the source code so that the number of communications among the secure computation servers associated with the multiplications is reduced.

Further, for example, if the dedicated multiparty computation source code is based on C language, the compilation part 303 operates as a C compiler while performing processing relating to multiplication. Similarly for other languages, the compilation part 303 performs compilation corresponding to the language used for the dedicated multiparty computation source code while performing the processing relating to multiplication (generating bytecode). It is noted that a system administrator may enter the language of the dedicated multiparty computation source code into the verification apparatus 20 in advance, or the compilation part 303 may automatically identify the language used.

The verification environment control part 304 controls the verification environment 30. More specifically, the verification environment control part 304 selects at least one bytecode from the plurality of bytecodes as a verification code and provides at least one verification code to the verification environment 30. For example, the verification environment control part 304 selects one of a plurality of generated bytecodes and transmits the selected code to each secure computation server 10 as a "verification code."

Further, the verification environment control part 304 generates the "communication environment parameters" based on the information on a network in the user environment included in the requirements specification obtained from the user and transmits the generated communication environment parameters to each secure computation server 10.

The verification environment control part 304 acquires an execution result from one secure computation server 10 out of the three secure computation servers 10. The verification environment control part 304 stores the acquired execution result in the storage part 307 in association with the corresponding verification code. The verification environment control part 304 repeats the processing (transmitting a verification code and storing the execution result) for every bytecode generated by the compilation part 303.

Based on the execution result of each verification code stored in the storage part 307, the evaluation part 305 generates an evaluation index with respect to the execution result of each verification code. For example, the evaluation part 305 generates the number of processed cases (throughput) per unit time (for example, one second) as the evaluation index for each verification code. Alternatively, the evaluation part 305 generates, as the evaluation index, a response time (latency) from a time when a verification code is outputted until a time when the execution result is obtained.

Further, in order to increase reliability of the evaluation index, the evaluation part 305 may calculate a mean, median, mode, etc., of a plurality of execution results of the same verification code as the evaluation index.

FIG. 7 is a diagram illustrating an example of the verification codes and the results of the evaluation indices (throughput) generated by the evaluation part 305. As illustrated in FIG. 7, the evaluation part 305 calculates an evaluation index for each verification code and manages the result thereof in association with the verification code. Note that FIG. 7 also shows compile options that served as a basis when each verification code was generated (options selected when the code was generated).

As described above, the evaluation part 305 generates at least the information that associates a verification code with an evaluation index corresponding to the verification code.

The output part 306 selects at least one recommended code from a plurality of multiparty computation executable codes, based on the evaluation index for each verification code and outputs the selected recommended code. More specifically, the output part 306 selects the best performing code from the plurality of bytecodes (verification codes) generated by the compilation part 303. For example, when the response time (latency) has been calculated as the evaluation index, the output part 306 selects the bytecode with the shortest response time. Alternatively, when the number of processed cases (throughput) per unit time is calculated as the evaluation index, the output part 306 selects the bytecode with the largest number of processed cases. Further, the output part 306 may select any code meeting a certain condition, instead of selecting the best performing code. For example, with the response time (latency) as the evaluation index, the output part 306 may select a code according to a predetermined criterion from codes with latency less than or equal to a certain period of time. Alternatively, the output part 306 may (randomly) select any code from codes with latency less than or equal to a certain period of time without any predetermined criterion defined.

The output part 306 outputs the selected bytecode to the outside as a "recommended code." For example, the output part 306 writes the recommended code to an external storage device such as a USB (Universal Serial Bus) memory. Alternatively, the output part 306 may display information regarding the file name of the recommended code or where it is stored on a liquid crystal display monitor or transmit the recommended code to another apparatus via a network.

[System Operation]

Figure 8:
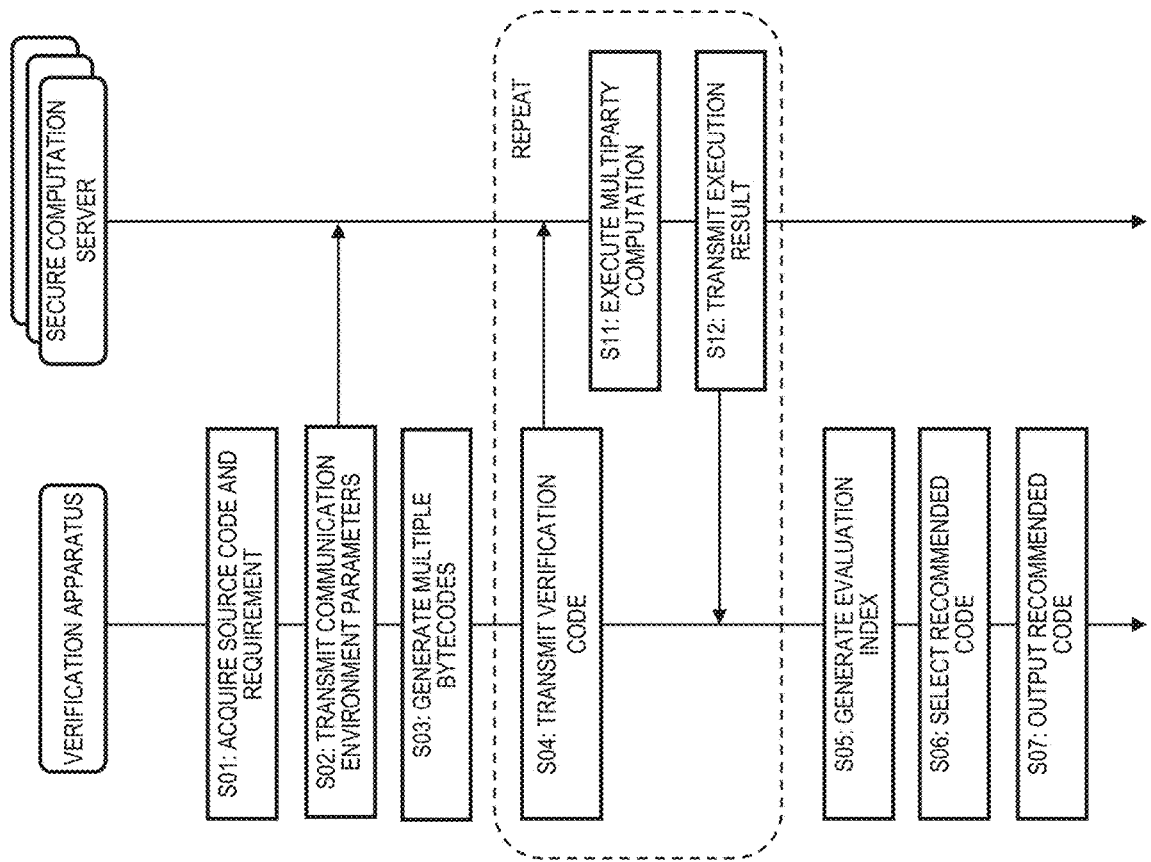
FIG. 8 is a sequence diagram illustrating an example of the operation of the multiparty computation verification system according to the first example embodiment.

Next, with reference to FIG. 8, the operation of the multiparty computation verification system according to the first example embodiment will be described.

First, the verification apparatus 20 acquires a "source code" and a "requirements specification" from a user (step S01).

The verification apparatus 20 generates the "communication environment parameter(s)" from the information included in the requirements specification and transmits the parameter(s) to each secure computation server 10 (step S02).

The verification apparatus 20, while encompassing all the combinations of compile options settable for a multiparty computation compiler, compiles the acquired source code to generate a plurality of bytecodes (step S03).

The verification apparatus 20 selects one from the plurality of the generated bytecodes and transmits the selected code to each secure computation server 10 as a "verification code" (step S04).

The secure computation servers 10 execute multiparty computation using the obtained verification code (step S11).

Of the three secure computation servers 10, the server (representative server) that reconstructs secret-shared data, transmits an execution result of multiparty computation to the verification apparatus 20 (step S12).

The verification apparatus 20 and the secure computation servers 10 repeat the processes of the steps S04, S11, and S12 for all the bytecodes.

The verification apparatus 20 generates an evaluation index for each verification code (step S05).

The verification apparatus 20 selects a recommended code, based on the evaluation index for each verification code (step S06). For example, the verification apparatus 20 selects the best performing verification code (highest throughput or lowest latency) as the recommended code.

The verification apparatus 20 outputs the selected recommended code to the outside (step S07).

[Variation of the First Example Embodiment]

In the first example embodiment, as the verification environment 30, a dedicated environment for verifying performance for a verification code is used. The verification environment 30, however, does not have to be a dedicated environment.

For example, an on-premises environment (server/facilities owned by a user) in which the user plans to actually execute multiparty computation may be used as the verification environment 30. That is, the verification apparatus 20 may verify each bytecode in an environment in which the user plans to actually execute multiparty computation to choose an optimal bytecode (recommended code).

Alternatively, a cloud environment in which the user plans to execute multiparty computation may be used as the verification environment.

In this manner, the environment for verifying a plurality of bytecodes generated by combining various compile options may be a dedicated environment or one actually used by the user (on-premises or cloud environment). That is, the environment for verifying bytecode may be the same as or different from the environment in which multiparty computation is actually executed.

When an on-premises environment or a cloud environment provided by a service provider is used as the "verification environment," simulating one is not necessary and therefore simulating a user environment by using the "communication environment parameters" is not required. Further, as described above, the verification apparatus 20 simulates the user environment by setting the "communication environment parameters" in the secure computation servers 10. However, the communication environment parameters may be preset in the secure computation servers 10. That is, the verification apparatus 20 does not have to obtain from the user the information regarding the network in the user environment as the "requirements specification", as long as the information for simulating the user environment is preset in the secure computation servers 10.

Here, a recommended code selected in an actual user environment may be more suitable than one selected in a simulated user environment. Therefore, it is desirable that a recommended code be determined in an actual environment in which the user plans to execute multiparty computation if there are no time constraints, or access right restriction, etc.

As described above, in the first example embodiment, the verification apparatus 20 acquires a source code for multiparty computation from a user and generates a plurality of bytecodes by changing combinations of compile options when compiling the source code. The verification apparatus 20 causes each of a plurality of the generated bytecodes to be executed by a verification environment simulating an environment in which the user plans to execute multiparty computation. The verification apparatus 20 evaluates an execution result of each verification code in the verification environment 30 and provides (externally outputs) a verification code (bytecode) suitable for a user environment as a recommended code to the user. As a result, it becomes possible to reliably detect a bytecode suitable for a user environment (user's network configuration) from a plurality of bytecodes generatable from combinations of compile options. That is, it is possible to recommend a bytecode (multiparty computation executable code) suitable for the user environment.

[Second Example Embodiment]

Next, a second example embodiment will be described in detail with reference to the drawings.

In the first example embodiment, the requirements specification includes information for simulating a user environment (information regarding a network in the user environment), however, the requirements specification may include other types of information. In the second example embodiment, the requirements specification includes information other than a network configuration in the user environment.

It is noted that a system configuration and a processing configuration of each apparatus in the second example embodiment are the same as those in the first example embodiment and descriptions corresponding to those of FIGS. 2, 3, and 5 will be omitted.

For example, information regarding performance of multiparty computation (throughput and latency) may be included in the requirements specification. For example, achieving "a throughput of 100 cases per second or higher" may be a requirements specification. Alternatively, a condition such as "a latency of 10 seconds or lower" may be a requirements specification.

The verification apparatus 20 relating to the second example embodiment may select a verification code meeting such a requirements specification and provide the verification code to a user as a "recommended code." For example, in a case where a requirements specification from the user is "a throughput of 100 cases per second or higher" and an evaluation index for each verification code is as illustrated in FIG. 7, since code 2 or 3 in FIG. 7 meets the requirements specification, the verification apparatus 20 provides either one or both to the user as a "recommended code."

Further, as in the first example embodiment, a requirements specification may include information for generating "communication environment parameters" and information regarding a performance in the second example embodiment, or a requirements specification may include only information regarding the performance. That is, the user environment may be simulated in the verification environment 30 in advance, and at least one bytecode (verification code) meeting a user's requirements specification may be selected from bytecodes executable in the verification environment 30 and provided as a recommended code.

As described above, in the second example embodiment, the output part 306 selects at least one recommended code from a plurality of verification codes based on the information (requirements specification) regarding a performance of multiparty computation. In this way, by including information regarding a performance of multiparty computation in a requirements specification, a bytecode meeting a user's requirements specification can be extracted from among bytecodes executable in a user environment and provided to a user as a "recommended code."

[Third Example Embodiment]

Next, a third example embodiment will be described in detail with reference to the drawings.

In the third example embodiment, a recommended code and recommended environment are chosen using a plurality of verification environments 40. Further, the user environment is not simulated using the communication environment parameters in the third example embodiment.

Figure 9:
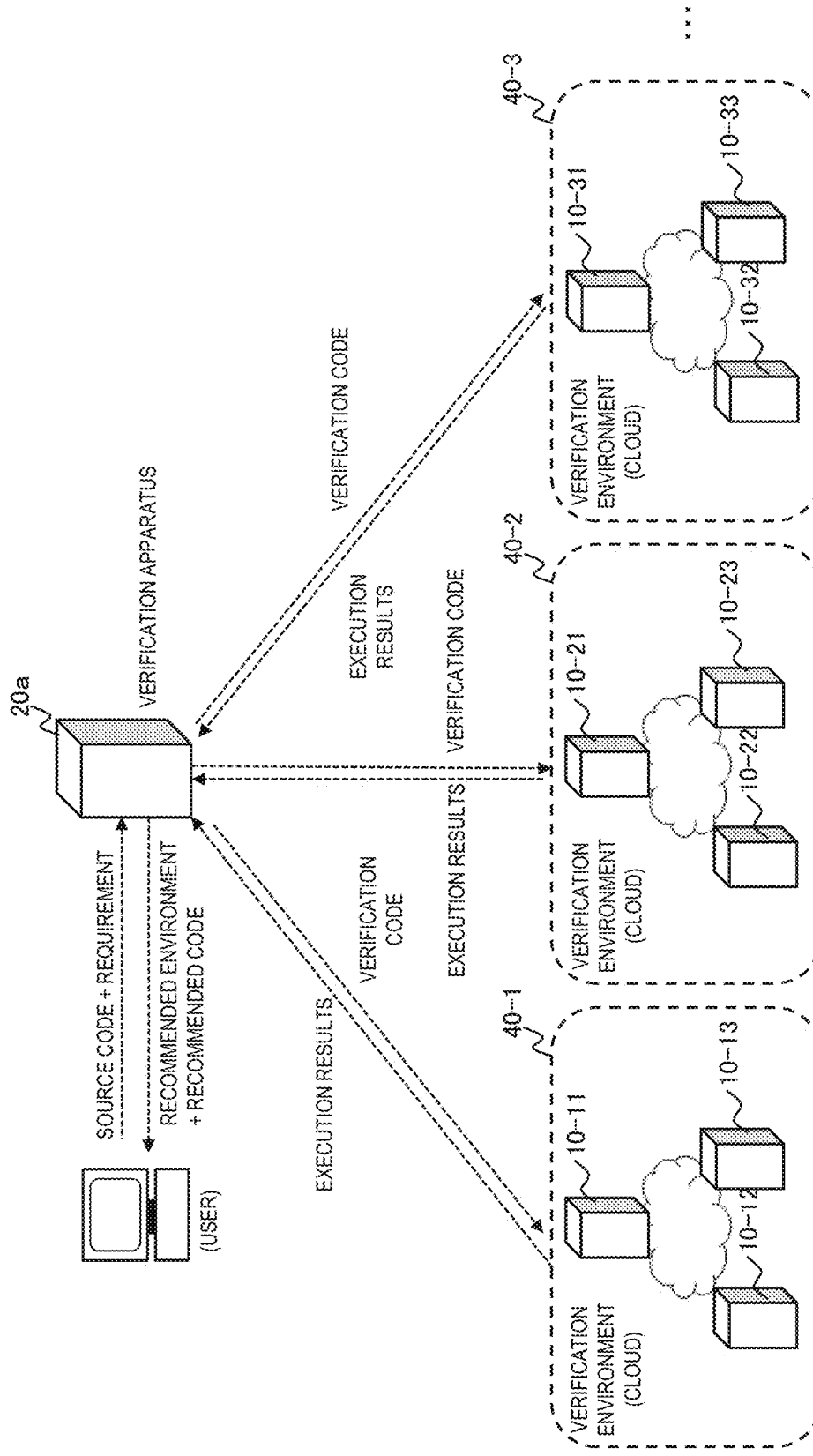
FIG. 9 is a diagram illustrating an example of a schematic configuration of a multiparty computation verification system relating to a third example embodiment.

FIG. 9 is a diagram illustrating an example of a schematic configuration of a multiparty computation verification system according to the third example embodiment. Referring to FIG. 9, the multiparty computation verification system includes a plurality of the verification environments 40.

For example, a cloud system provided by an EC (Electronic Commerce) service provider corresponds to the verification environment 40.

In the third example embodiment, an instance (virtual machine) provided by the cloud system serving as the verification environment is treated as the secure computation server 10 described in the first example embodiment. Further, a plurality of the verification environments 40 has different characteristics from each other. For example, a performance of an instance (virtual machine) provided by each verification environment 40 and communication characteristics between the instances are different from each other. As a result, even if the same bytecode (verification code) is fed to the secure computation server 10 included in each verification environment 40, a performance of multiparty computation obtained by the code will be different. For example, when the same verification code is provided to verification environments 40-1 and 40-2 to have them execute multiparty computation, the performances (throughput and latency) thereof may be different from each other.

As described above, the requirements specification includes the information regarding the performance (throughput and latency) with respect to multiparty computation. A verification apparatus 20a according to the third example embodiment selects a verification environment 40 matching the requirements specification and provides the selected verification environment 40 as a "recommended environment" to a user. Further, the verification apparatus 20a provides a bytecode recommended for multiparty computation execution in the recommended environment to the user as a "recommended code."

For example, when a verification environment meeting the multiparty computation performance (throughput and latency) requested by the user is the verification environment 40-1 in FIG. 9, the best performing code is selected from among bytecodes executable in the verification environment 40-1. In this case, the verification apparatus 20a recommends the "verification environment (cloud) 40-1" as an environment for executing multiparty computation meeting the requirements specification and outputs a recommended code for the environment.

Figure 10:
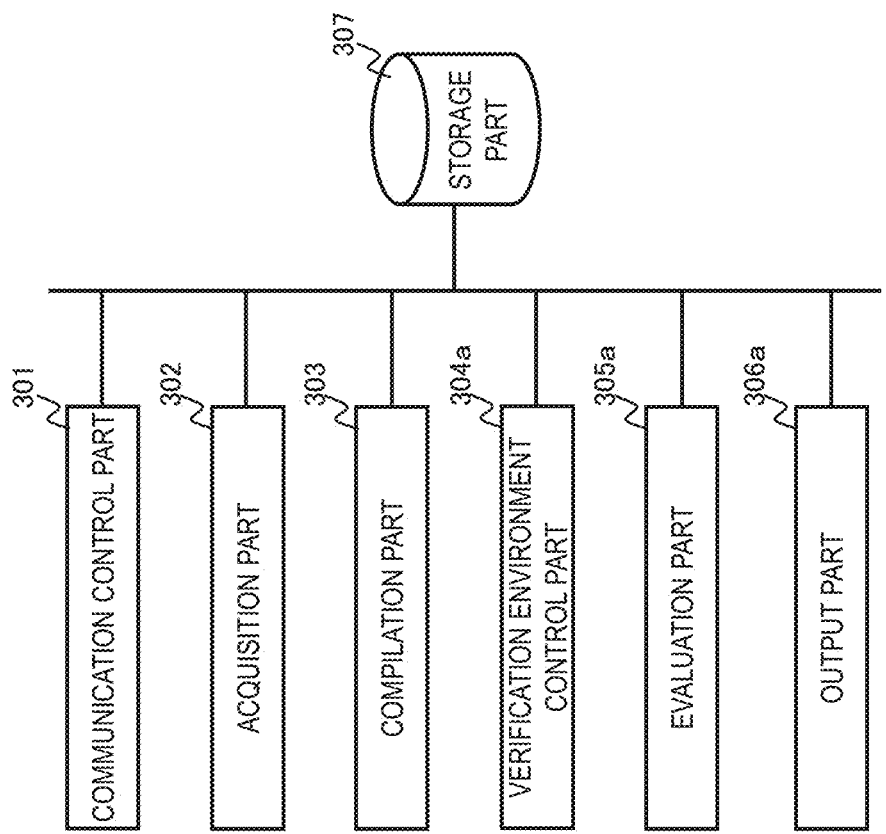
FIG. 10 is a diagram illustrating an example of a processing configuration of a verification apparatus according to the third example embodiment.

FIG. 10 is a diagram illustrating an example of a processing configuration (processing modules) of the verification apparatus 20a according to the third example embodiment. The verification apparatus 20a illustrated in FIG. 10 differs from the verification apparatus 20 illustrated in FIG. 5 in each operation of the verification environment control part 304, the evaluation part 305, and the output part 306. These differences will be mainly described below.

A verification environment control part 304a transmits a verification code to each of the plurality of the verification environments 40 and acquires an execution result of multiparty computation using the verification code. After completing control (providing a verification code, colleting the execution result) of one verification environment 40, the verification environment control part 304a may control a next verification environment 40 or it may control two or more verification environments 40 in parallel.

The verification environment control part 304a may control the verification environments 40 in any manner as long as it is able to provide a plurality of bytecodes (verification codes) generated by the compilation part 303 to each verification environment 40 without any omissions and collect execution results thereof.

A basic operation of an evaluation part 305a is the same as the operation of the evaluation part 305 described in the first example embodiment. The evaluation part 305a generates an evaluation index with respect to an execution result of a verification code for each of a plurality of the verification environments 40. More specifically, the evaluation part 305a generates the information as illustrated in FIG. 7 for each verification environment 40.

An output part 306a selects a recommended code based on the evaluation indices generated by the evaluation part 305a and outputs the verification environment 40 corresponding to the selected recommended code as a "recommended environment." More specifically, the output part 306a selects the best performing verification code for each verification environment 40. For example, the output part 306a extracts the evaluation result (the best performing verification code) for each verification environment 40 as illustrated in FIG. 11. Note that FIG. 11 illustrates results when the requirements specification from the user includes "a throughput of 100 cases or more."

As illustrated in FIG. 11, each of the verification environments 40-1 and 40-2 has a verification code meeting the requirements specification. On the contrary, a verification environment 40-3 does not have a verification code that meets the requirements specification from the user.

In the example of FIG. 11, since the verification environment 40-2 has the best execution result, the output part 306a selects the verification environment 40-2 as a "recommended environment" and code 21, the best performing code in this environment, as a "recommended code." The output part 306a provides these pieces of information (the recommended environment and the recommended code) to the user.

Alternatively, instead of a specific performance value, the requirements specification may indicate that "performance prioritized." In this case, the output part 306a provides the best performing verification environment 40-2 as a recommended environment to the user.

Further, the requirements specification acquired from the user may not include information regarding the performance. For example, the requirements specification may indicate that "cost prioritized" without including any information on the performance. In this case, the output part 306a recommends the environment with the lowest cost out of the verification environments 40 that can execute the multiparty computation relating to the source code acquired from the user. For example, in the example of FIG. 11, if a cost of the verification environment 40-3 is the lowest, the output part 306a will recommend a bytecode corresponding to the environment 40-3.

Alternatively, the requirements specification may indicate that "legal requirements prioritized." In recent year, there has been a strong demand for protection of personal information as represented by the GDPR (General Data Protection Regulation) and restrictions are expected to be imposed on transfer(relocation) of data (information).

In multiparty computation using a plurality of the secure computation servers 10, since information is transmitted/received among the servers, a process may be recognized as a violation of the GDPR rules, depending on a region where the server is installed. Therefore, when the requirements specification indicates that "legal requirements prioritized," the output part 306a may select and recommend a verification environment 40 that minimizes legal risk from the plurality of the verification environments 40.

For example, in a case where a target of the legal requirements prioritized is assumed to be the GDPR, when all the secure computation servers 10 included in the verification environment 40-1 are located in EU (European Union) member states, the verification environment 40-1 is determined to have a low legal risk and selected as a recommended environment.

Alternatively, legal risk is also determined to be low when all the secure computation servers 10 included in the verification environment 40-2 are located in regions in which the GDPR is not applied. In this case, the verification environment 40-2 is selected as a recommended environment.

Further, detailed information (for example, a cost, a region on which a server is installed, etc.) of each verification environment 40 may be stored in advance in the verification apparatus 20a, or the verification apparatus 20a may obtain the information from an external server.

As described above, in the third example embodiment, the verification code corresponding to an environment (cloud) recommended to the user is selected based on an evaluation result generated by the evaluation part 305a, and these pieces of information are provided to the user. More specifically, based on the evaluation index for each verification environment 40, the output part 306a selects the verification environment 40 that achieves the best performing multiparty computation from the verification environments 40 that can provide bytecodes meeting the user's requirements specification (for example, a requirements specification with respect to the performance). As a result, from a plurality of verification environments, an environment matching the user's requirements specification and a bytecode executed in the environment are selected as a "recommended environment" and a "recommended code," respectively, and provided to the user.

[Fourth Example Embodiment]

Next, a fourth example embodiment will be described in detail with reference to the drawings.

Figure 12:
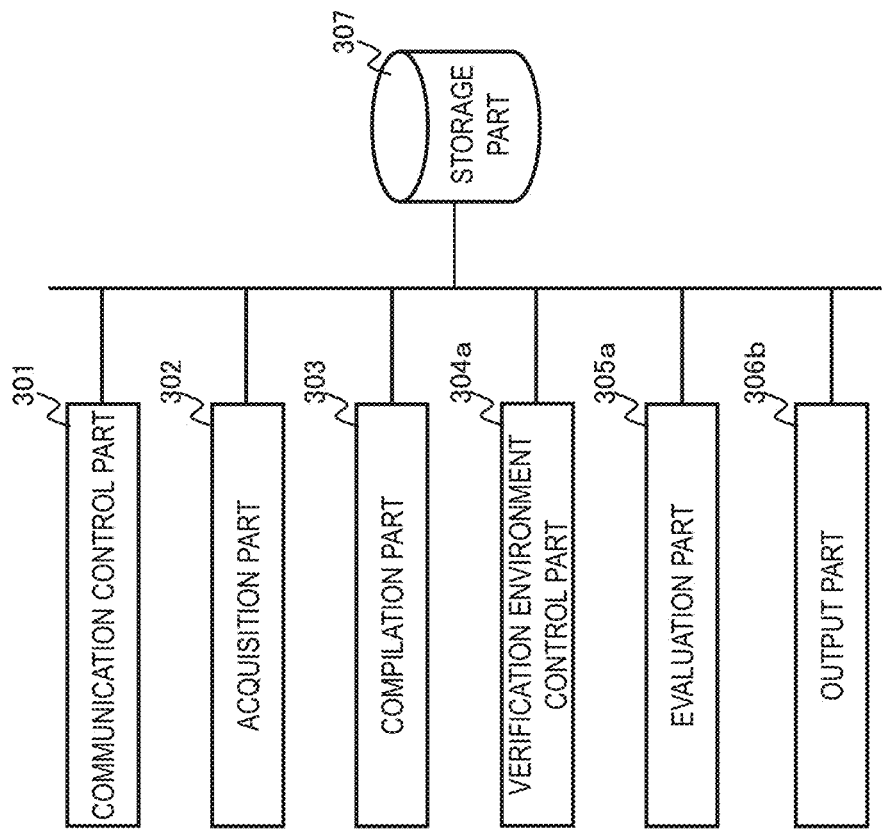
FIG. 12 is a diagram illustrating an example of a processing configuration of a verification apparatus relating to a fourth example embodiment.

In the fourth example embodiment, a plurality of requests are included in a requirements specification. FIG. 12 is a diagram illustrating an example of a processing configuration (processing modules) of a verification apparatus 20b according to the fourth example embodiment.

The verification apparatus 20b according to the fourth example embodiment differs from the verification apparatus 20a according to the third example embodiment in the operation and function of an output part 306b. The following describes mainly the difference.

In the third example embodiment, when a plurality of the verification environments 40 meets a requirements specification from a user, for example, the environment giving the best performing multiparty computation is recommended. It is not, however, always necessary to select the best performing environment as long as the requirements specification from the user is met. For example, in the example of FIG. 11, the verification environments 40-1 and 40-2 satisfy the user requirements specification (a throughput of 100 cases or more) and the better performing verification environment 40-2 is recommended.

It is, however, possible that the verification environment 40-1, not 40-2, may be an environment to be truly recommended to the user. For example, each verification environment 40 has a different usage fee per time period. In this case, if a cost required for executing multiparty computation (i.e., usage fee per time period) is lower with the verification environment 40-1 than with the verification environment 40-2, an environment to be truly recommended to the user is likely to be the verification environment 40-1.

The verification apparatus 20b according to the fourth example embodiment determines an environment to be recommended to the user, based on a factor other than the performance of multiparty computation. For example, in a case where the requirements specifications acquired from the user include a throughput of 100 cases or more (first requirement) and cost prioritized (second requirement), the output part 306b recommends an environment with a lower cost (running cost) out of the verification environments 40 meeting the performance requirements specification (throughput).

For example, in the example of FIG. 11, if the verification environment 40-1 is lower in cost than the verification environment 40-2, the output part 306b will output the verification environment 40-1 as a recommended environment and code 11 as a recommended code.

As described above, when there is a plurality of the verification environments 40 offering evaluation indices that satisfy a first requirement included in the user requirements specification, the verification apparatus 20b according to the fourth example embodiment selects a recommended environment from a plurality of the verification environments 40 based on a second requirement included in the user requirements specification and outputs the recommended environment. As a result, a recommended environment and a recommended code that the user truly needs are provided.

[Fifth Example Embodiment]

Next, a fifth example embodiment will be described in detail with reference to the drawings.

In the fifth example embodiment, the compilation part 303 narrows down compile options used when generating bytecode. In the previous example embodiments, the compilation part 303 varies options for all possible combinations to generate a plurality of bytecodes.

In the fifth example embodiment, options to be used are narrowed down based on the requirements specification obtained from the user without using all options. It is noted that the system configuration in the fifth example embodiment is the same as that in the first example embodiment and a description corresponding to that of FIG. 2 will be omitted.

Figure 13:
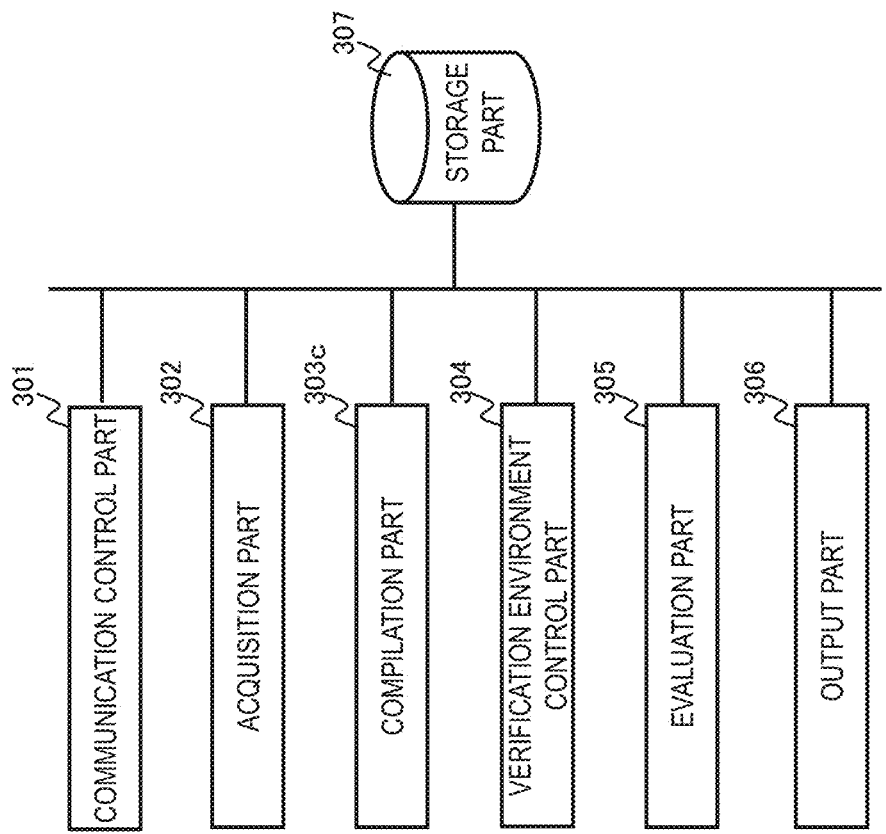
FIG. 13 is a diagram illustrating an example of a processing configuration of a verification apparatus relating to a fifth example embodiment.

FIG. 13 is a diagram illustrating an example of a processing configuration (processing modules) of a verification apparatus 20c according to the fifth example embodiment. Referring to FIG. 13, the verification apparatus 20c according to the fifth example embodiment differs from the verification apparatus 20 according to the first example embodiment in the operation and function of a compilation part 303c. These differences will be mainly described below.

As described above, a requirements specification obtained from a user may include various types of information. For example, one of requirements specifications may indicate that "code size prioritized." In this case, the compilation part 303c generates a plurality of bytecodes while excluding options that are expected to increase a code size. For example, with reference to the compile option list illustrated in FIG. 6, the compilation part 303c generates a plurality of bytecodes while fixing the option for the code size to "1" and varying other options.

Alternatively, a requirements specification may include a requirements specification regarding time from when a user enters necessary information (a source code, the requirements specification) into the verification apparatus 20c to when a recommended code is obtained. Compiling multiparty computation normally takes a relatively long time. Therefore, it takes a significant amount of time to generate a large amount of bytecode by varying compile options. Some users, however, demand a result (recommended code) in a short period of time because they want to hurry up a system operation.

In such a case, the compilation part 303c selects some of the options, not all of them, according to the requirements specification and generates a limited number of bytecodes. The verification apparatus 20c selects the most suitable code for the user from the limited number of bytecodes (verification codes) and provides the selected code as a "recommended code" to the user.

For example, to some extent, optimal compile options can be deduced from an environment in which the user plans to execute multiparty computation. More specifically, when a user's execution environment has a wide communication bandwidth, bytecode with a small communication amount per communication between the secure computation servers 10 is often advantageous. Conversely, when the user's execution environment has a narrow communication bandwidth, bytecode with a large number of communications between the secure computation servers 10 is often advantageous.

In the compilation of multiparty computation, it is possible to grasp a communication amount and the number of communications required when each option is selected (enabled). Therefore, the compilation part 303c may limit the number of generated bytecodes by not selecting some compile options according to characteristics of a communication path (for example, a communication bandwidth and a latency) included in the requirements specification.

Alternatively, a requirements specification from a user may indicate "security prioritized." In this case, the compilation part 303c may enable and fix a security option (for example, fraud detection option) and vary other options to generate a plurality of bytecodes.

As described above, the verification apparatus 20c according to the fifth example embodiment fixes some options out of options settable to a multiparty computation compiler, based on a requirements specification to generate a plurality of multiparty computation executable codes. As a result, it becomes possible to quickly provide a recommended environment and a recommended code while meeting the requirements specification from a user and reducing the number of bytecodes to be verified.

[Sixth Example Embodiment]

Next, a sixth example embodiment will be described in detail with reference to the drawings.

In the first to the fifth example embodiments, the user enters a source code (dedicated multiparty computation source code) processable by a multiparty computation compiler. In the sixth example embodiment, the user enters a normal source code written in a general-purpose language into a verification apparatus 20d, instead of entering the dedicated multiparty computation source code.

Figure 14:
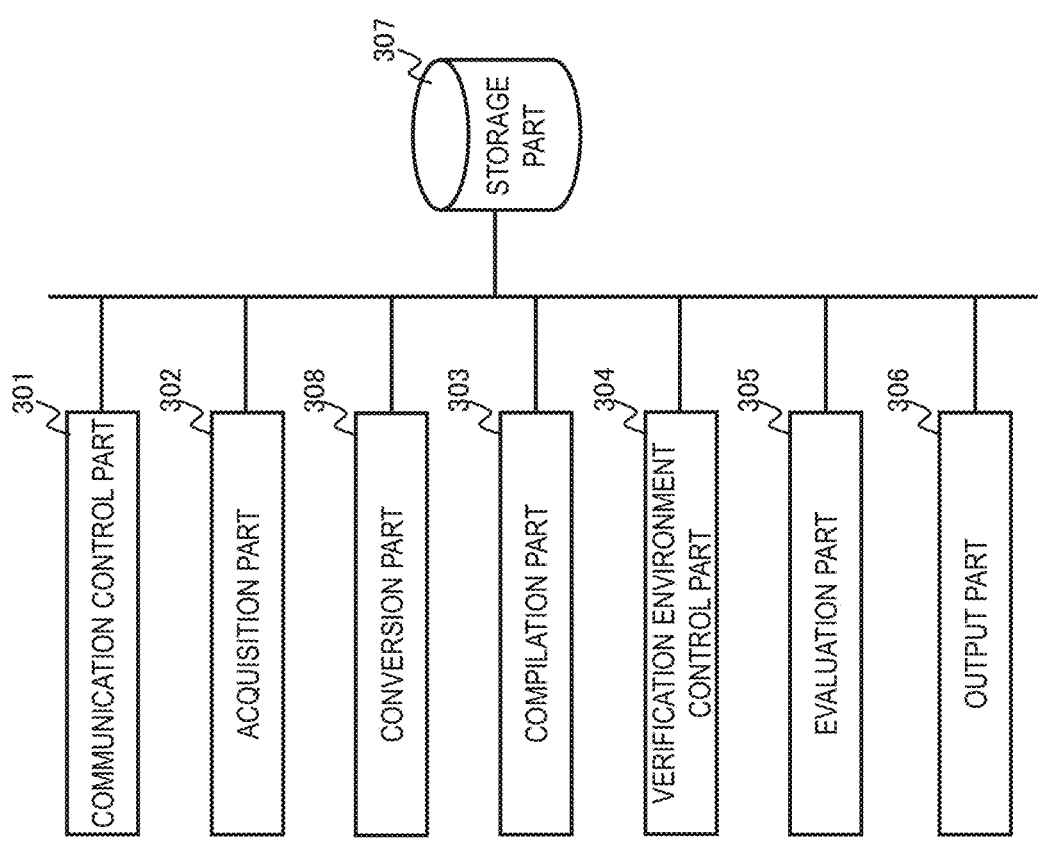
FIG. 14 is a diagram illustrating an example of a processing configuration of a verification apparatus relating to a sixth example embodiment.

FIG. 14 is a diagram illustrating an example of a processing configuration (processing modules) of the verification apparatus 20d according to the sixth example embodiment. Referring to FIG. 14, the verification apparatus 20d according to the sixth example embodiment has a conversion part 308 added thereto, compared with the verification apparatus 20 according to the first example embodiment. The following describes mainly the difference.

When the multiparty computation compiler (the compilation part 303) cannot process a source code for multiparty computation, the conversion part 308 converts the source code un-processable by the multiparty computation compiler into a source code processable by the multiparty computation compiler. More specifically, based on setting information regarding multiparty computation to be executed by a plurality of the secure computation servers 10, the conversion part 308 converts a source code entered via the acquisition part 302 so that the multiparty computation compiler can process it. That is, the conversion part 308 converts the source code entered by the user into a dedicated multiparty computation source code. The detailed operation of the conversion part 308 will be described later. Note that a source code un-processable by the multiparty computation compiler is a source code (general-purpose source code) that is not specified to be processed with multiparty computation. That is, a source code processable by the multiparty computation compiler is a source code in which a particular process is specified (can be specified) to be processed with multiparty computation.

For example, the storage part 307 stores the setting information required for the conversion process performed by the conversion part 308. The more concrete content of the setting information stored in the storage part 307 will be described later along with the operation of the conversion part 308.

Next, the operation of the conversion part 308 will be described with reference to the drawings.

The conversion part 308 obtains a source code via the acquisition part 302. Here, it is assumed that the conversion part 308 has obtained a source code illustrated in FIG. 15. The source code illustrated in FIG. 15 is written in Python. This is a non-limiting example and the source code language is as a matter of course limited to Python. The conversion part 308 is able to convert a source code written in any language such as C, BASIC, assembly language, etc.

The source code illustrated in FIG. 15 multiplies externally acquired input data by 10 and calculates a mean value of the input data multiplied by 10. The program illustrated in FIG. 15 includes a main function ("main") and a sub-function ("function") and calculates the mean value.

The conversion part 308 converts the source code illustrated in FIG. 15 and generates a "dedicated multiparty computation source code" to be provided to the compilation part 303. At this time, the conversion part 308 refers to setting information stored in the storage part 307.

FIGS. 16A, 16B, 16C, 16D, and 16E are diagrams showing examples of the setting information referred to by the conversion part 308. The setting information includes information regarding the secure computation servers 10 and various rules determining a conversion operation of the conversion part 308. For example, the setting information includes rules regarding the conversion processing on an input function and output function and rules regarding the conversion processing on parameters and types.

FIG. 16A illustrates an example of the information regarding the secure computation servers 10. FIG. 16A indicates settings for "data input format" and "data reconstruction entity" as the information regarding the secure computation servers 10.

The data input format setting defines how the secure computation server 10 acquires data required for executing multiparty computation.

As illustrated in FIG. 16A, in a possible data input format, a server specified as a representative server out of a plurality of the secure computation servers 10 receives input data, performs secret sharing of the input data and distributes shares to the other secure computation servers 10. In the examples of FIGS. 2 and 16A, the secure computation server 10-1 serving as a representative server performs secret sharing of the input data and distributes the shares to the other secure computation servers 10-2 and 10-3.

Setting regarding data reconstruction entity defines a server that reconstructs results obtained from multiparty computation. For example, in the example of FIG. 16A, the secure computation server 10-1 serving as the representative server collects results of multiparty computation from the other secure computation servers 10-2 and 10-3 and reconstructs its own computation result and the collected computation results. In the example illustrated in FIG. 15, since the mean value of the input data that have been multiplied by 10 is distributed among the secure computation servers 10, the secure computation server 10-1 serving as the representative server reconstructs this mean value.

FIG. 16B is a diagram illustrating an example of the rule for the conversion processing on an input function. The conversion part 308 converts an input function specified by the rule into a function suitable for multiparty computation.

In the example of FIG. 16B, when the source code includes "get_input" therein, the conversion part 308 rewrites this input function to "get_input_from( )." Note that an identifier of the representative server that acquires the input data is inserted in the parentheses following "from" in the function.

FIG. 16C is a diagram illustrating an example of the rule for the conversion processing on an output function. The conversion part 308 converts an output function specified by the rule into a function suitable for multiparty computation.

In the example of FIG. 16C, when the source code includes "print_ln" therein, the conversion part 308 adds "reveal( )" to the arguments of the output function. Note that an identifier of the representative server that reconstructs the computation result is inserted in the parentheses following "reveal."

FIG. 16D is a diagram illustrating an example of the setting for the conversion processing on parameters. The conversion part 308 determines whether or not parameters and constants other than input data should be secret-shared based on this setting. For example, a value such as "minimum" or "maximum" can be set in the setting for the conversion processing on parameters.

When the setting is set to "minimum," secret-shared input data and the parameters affected by the input data are made targets of secret-sharing. Further, when the setting is set to "maximum," all the parameters and constants included in the source code are made targets of secret-sharing.

FIG. 16E is a diagram illustrating an example of the settings for the conversion processing on a type. When a type for a parameter is specified in the source code, the conversion part 308 converts the parameter into a multiparty computation type corresponding to the specified type.

Depending on the language, however, a type may not be specified. In this case, the conversion part 308 refers to the type conversion processing setting and uses a multiparty computation type corresponding to the set value. In the example of FIG. 16E, the conversion part 308 converts a parameter without a specified type to an integer type for secure computation.

Further, the type conversion processing settings include a setting that allows a division result to be a "fixed-point" or "floating-point" number. In the example of FIG. 16E, a result of dividing secret-shared parameters is defined to be a fixed-point number.

Next, with reference to the source code illustrated in FIG. 15, the conversion processing of the conversion part 308 using the setting information described above will be described in detail. First, from the source code, the conversion part 308 detects (extracts) a function specified in the input function setting of the setting information.

In the example of FIGS. 16A-16E, the conversion part 308 tries to detect "get_input." The conversion part 308 detects this function in the fifth line of the source code illustrated in FIG. 15. The conversion part 308 refers to the secure computation server setting in the setting information and confirms the set value regarding "data input format."

In FIGS. 16A-16E, the representative server (the secure computation server 10-1) is configured to perform secret sharing, and the conversion part 308 sets the identifier (for example, "1") of the secure computation server 10-1 in the parentheses of "get_input_from( )" illustrated in FIG. 16B. As a result, as illustrated in the fifth line in FIG. 17, "get_input" is converted to "sint.get_input_from(1)."

Further, since the line "get_input" does not explicitly specify a type, the conversion part 308 follows the setting in FIG. 16E and sets "sint," an integer type for secure computation, for the function.

As described above, the conversion part 308 replaces a predetermined input function included in the source code and also included in the setting information, with an input function for multiparty computation. At this time, the conversion part 308 sets in the input function for multiparty computation the information of the secure computation server (representative server) that acquires data to be secret-shared out of a plurality of the secure computation servers as necessary.

Here, the conversion part 308 makes a parameter of a storage destination of data acquired by the input function (for acquiring data from an external apparatus) a target of secret sharing. In the example of FIG. 15, the parameter "input_values" in the third and the fifth lines is a target of secret sharing.

Next, the conversion part 308 refers to the setting for the secret sharing of parameters in the setting information.

In the example of FIG. 16D, since "minimum" is set for this setting, the conversion part 308 sets a secret-sharing target parameter determined by the input function and parameters affected by this parameter as targets of secret sharing.

In the example of FIG. 15, "input_values" is a secret-sharing target parameter. Further, in the seventh line in FIG. 15, this parameter is used as the first argument of the function "mean." In this function, the first argument (value) is multiplied by 10 and then added to a parameter "sum" in the $14^{th}$ line. Therefore, the parameter "sum" becomes a target of secret-sharing since it is affected by a secret-shared parameter.

Further, since the parameter "sum" is divided by the second argument (num) of the function "mean" in the $15^{th}$ line, the parameter "mean" is also affected by a secret-shared parameter (indirectly). As a result, the parameter "mean" also becomes a target of secret-sharing.

In summary, the parameters "input_values," "sum," and "mean" are secret-sharing targets in the example of FIG. 15.

The conversion part 308 checks "type conversion processing setting" in the setting information, determines a type(s) for a parameter(s) of secret-sharing target(s), and reflects the type determined in the source code.

The example in FIG. 16E requires conversion into an "integer type for secure computation" when a type is not specified. Since the parameter "input_values" does not have any type specified, the conversion part 308 treats the type of the parameter as an integer type. More specifically, as illustrated in the third line in FIG. 17, the conversion part 308 converts the type of a function "Array" into "sint" indicating a secure computation integer type (treated as a secret-sharing integer type by the multiparty computation compiler).

Since the type of the parameter "sum" is specified as an integer type as illustrated in the 12$^{th}$ line in FIG. 15, the conversion part 308 maintains an integer type of the parameter without converting it and sets "sint" indicating that it is a secret-sharing target. More specifically, as illustrated in the 12$^{th}$ line in FIG. 17, the type of the parameter "sum" is set to "silt." Further, the initial value of the parameter is set to "0" in the 12$^{th}$ line in FIG. 17.

As for the type of the parameter "mean," the conversion part 308 pays attention to the fact that the parameter stores a result of dividing the secret-sharing target parameter "sum" by a constant (num, num input).

Since this is a division, the conversion part 308 refers to the setting (type for divisions) illustrated in FIG. 16E and converts the parameter "mean" into a fixed-point type for secure computation. More specifically, the conversion part 308 adds the processes of the 16$^{th}$ to the 19$^{th}$ lines illustrated in FIG. 17.

In more detail, the conversion part 308 defines new fixed-point type parameters corresponding to the parameters (sum, num) involving the division; a fixed-point type parameter "Sf" corresponding to the parameter "sum" and another fixed-point type parameter "Nf" corresponding to the constant "num" are defined (the 16$^{th}$ and the 18$^{th}$ lines in FIG. 17).

The conversion part 308 converts the integer types of the parameters "sum" and "num" into fixed-point types and loads these values into the new parameters "Sf" and "Nf" (the 17$^{th}$ and the 19$^{th}$ lines in FIG. 17). Since the new parameters replace the parameters "sum" and "num," the conversion part 308 replaces the division using these parameters with one using new parameters "Sf" and "Nf" (the 20$^{th}$ line in FIG. 17).

As described above, the conversion part 308 makes a first parameter ("input_values" in the above example) that stores data acquired by a predetermined input function a secret sharing target and converts the source code so that the first parameter is secret-shared. Further, the conversion part 308 sets a second parameter ("sum," etc., in the above example) affected by the first parameter as a secret sharing target and converts the source code so that the second parameter is secret-shared.

Next, from the source code, the conversion part 308 detects (extracts) a function specified in the output function setting of the setting information.

In the example of FIG. 16C, the conversion part 308 attempts to detect "print_ln." As a result, the conversion part 308 detects this function in the eighth line of the source code illustrated in FIG. 15. The conversion part 308 refers to the secure computation server setting in the setting information and confirms a set value in "data reconstruction server."

In the example of FIG. 16A, the representative server (the secure computation server 10-1) is configured to reconstruct the processing results. Therefore, the conversion part 308 sets an identifier (for example, "1") of the secure computation server 10-1 in the parentheses of "print_ln(-, result.reveal( ))", illustrated in FIG. 16C. As a result, as illustrated in the eighth line in FIG. 17, "print_ln('mean=% s'¥n, result)" is converted to "print_ln('mean=% s'¥n,result.reveal(1))."

As described above, the conversion part 308 replaces a predetermined output function, which is included in the source code and also included in the setting information, with an output function for multiparty computation. At this time, the conversion part 308 sets in the output function for multiparty computation the information of the secure computation server (representative server) that reconstructs the results of multiparty computation executed by a plurality of the secure computation servers 10 as necessary.

Next, the following describes an operation of the conversion part 308 when "maximum" is set in the parameter conversion processing setting illustrated in FIG. 16D.

When the set value is "maximum," the conversion part 308 secret-shares all the parameters and constants included in the source code. In the example of FIG. 15, "num_input" in the second line and a constant "10" in the 14$^{th}$ line are also secret-shared.

When the parameter conversion processing setting is set to "maximum," in the source code illustrated in FIG. 15, the conversion part 308 generates, for example, a dedicated secure computation code illustrated in FIG. 18. The differences between the dedicated secure computation codes illustrated in FIGS. 17 and 18 are as follows. In the second line in FIG. 18, "num_input" is defined as an integer type for secret sharing and "1000" is set as the value thereof. Further, in FIG.

18, an integer type parameter "p1" for secret sharing is added in the 13$^{th}$ line, and the constant "10" is replaced by this parameter "p1" in the 15$^{th}$ line.

As described above, when the parameter conversion processing setting is set to "maximum," in addition to a parameter externally acquired and a parameter affected thereby, the conversion part 308 secret-shares other parameters and constants in the source code.

This secret sharing scheme is able to robustly prevent the information included in the source code from being leaked. For example, if user's knowledge (know-how) is integrated into the constant "10" in the 14th line in FIG. 15, it is desirable to keep the constant secret. The conversion part 308 is able to create a dedicated multiparty computation source code that meets this need.

The compilation part 303 varies combinations of compile options for the dedicated multiparty computation source code generated by the conversion part 308 and generates a plurality of bytecodes.

As described above, the verification apparatus 20$d$ according to the sixth example embodiment acquires a normal source code from a user and converts the source code into a dedicated multiparty computation source code. As a result, the user is able to obtain an optimal bytecode for a user's environment without providing a dedicated multiparty computation source code. That is, the verification apparatus disclosed in the present application can accept a normal source code (written in C or the like) as a "source code for multiparty computation" or a dedicated multiparty computation source code.

[Variation of the Sixth Example Embodiment]

As described above, when a dedicated multiparty computation source code is generated, the parameter conversion processing settings can be changed. Specifically, an amount of secret-shared information can be minimized or maximized. Here, a level of secret sharing (minimum or maximum) affects a performance of multiparty computation (throughput and latency). That is, the lower the level of secret sharing, the higher the performance, and the higher the level of secret sharing, the lower the performance.

Therefore, the compilation part 303 may treat various settings (especially, a level of secret sharing) for converting a normal source code into a dedicated multiparty computation source code as compile options when generating a plurality of bytecodes.

More specifically, the compilation part 303 may vary a level of secret sharing (for example, minimum or maximum) to generate a plurality of bytecodes.

Alternatively, when the user requirements specification indicates that "security prioritized," the compilation part 303 may fix the level of secret sharing to "maximum" and vary other options to generate a plurality of bytecodes. On the other hand, when the user requirements specification indicates that "performance prioritized," the compilation part 303 may fix the level of secret sharing to "minimum" and vary other options to generate a plurality of bytecodes. In this case, the compilation part 303 may rewrite the setting information based on the requirements specification and instruct the conversion part 308 to reconvert the source code using the rewritten setting information.

Alternatively, the compilation part 303 may rewrite the setting information based on an evaluation index and instruct the conversion part 308 to reconvert the source code using the rewritten setting information. For example, if a recommended code and a recommended environment meeting the requirements specification cannot be obtained with an initial level of secret sharing, the setting information may be rewritten to expand options for verification codes. More specifically, if the compilation part 303 cannot obtain a bytecode meeting a user requirements specification with the initial setting (for example, the maximum level of secret sharing), the compilation part 303 may change the setting information which is referred to by the conversion part 308 (for example, to the minimum level of secret sharing). That is, the compilation part 303 may incorporate an evaluation result (evaluation index) from the evaluation part 305 into an operation of the conversion part 308.

As described above, in the variation according to the sixth example embodiment, the conversion part 308 rewrites the setting information based on an evaluation index or the requirements specification and generates a plurality of bytecodes. As a result, it becomes possible to quickly identify and reliably provide a recommended code suitable for a user's request.

[Hardware Configuration]

The following will describe the hardware configuration of each apparatus constituting the multiparty computation verification system.

Figure 19:
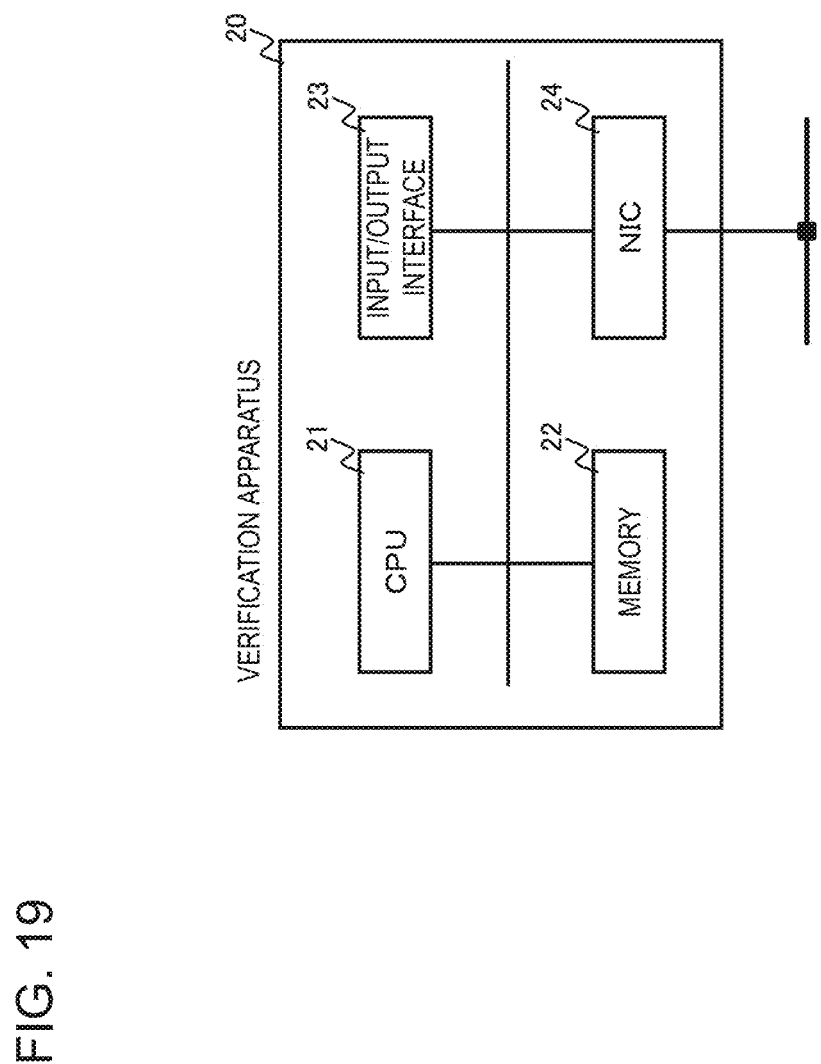
FIG. 19 is a diagram illustrating an example of the hardware configuration of the verification apparatus.

FIG. 19 is a diagram illustrating an example of the hardware configuration of the verification apparatus 20. The verification apparatus 20 is realized by an information processing apparatus (computer) and comprises the configuration illustrated in FIG. 19. For example, the verification apparatus 20 comprises a CPU (Central Processing Unit) 21, a memory 22, an input/output interface 23, and a NIC (Network Interface Card) 24, which is communication means. These elements are interconnected by an internal bus.

It should be noted that the configuration illustrated in FIG. 19 is not intended to limit the hardware configuration of the verification apparatus 20. The verification apparatus 20 may include hardware not illustrated in the drawing. The example of FIG. 19 does not limit the number of CPUs, etc., included in the verification apparatus 20 and for example, a plurality of the CPUs 21 may be included in the verification apparatus 20.

The memory 22 is a RAM (Random Access Memory), ROM (Read-Only Memory), or auxiliary storage device (such as a hard disk).

The input/output interface 23 is an interface for an input/output device not illustrated in the drawing. For example, the input/output device may be a display device, an operation device, etc. The display device is, for example, a liquid crystal display. The operation device is, for example, a keyboard and a mouse.

The functions of the verification apparatus 20 are realized by the processing modules described above. For example, these processing modules are realized by having the CPU 21 execute a program stored in the memory 22. This program may be downloaded via a network or updated using a storage medium storing the program. Further, the processing modules may be realized by a semiconductor chip. That is, the functions performed by the processing modules may be realized by some kind of hardware or by software running on hardware.

Further, the secure computation server 10 can also be realized by an information processing apparatus (computer), and since the hardware configuration thereof is evident to a skilled person, a detailed description will be omitted.

[Variations]

The configurations and the operations of the multiparty computation verification systems described in the first to the sixth example embodiments are examples, various variations of which are possible.

In the example embodiments described above, the user enters/outputs information using an operation device and a display device connected to the verification apparatus 20. The user, however, may enter/output necessary information using a terminal connected via a network.

In the example embodiments described above, basically one recommended code and one recommended environment are provided to the user. However, there is usually a plurality of bytecodes that satisfy the user requirements specification. In this case, bytecodes matching a predetermined bytecode rule that satisfies the user requirements specification may be uniformly provided to the user as "recommended codes." For example, when the user requirements specification indicates that "performance prioritized," the verification apparatus 20 outputs the best performing bytecode as a "recommended code," but among the bytecodes meeting the requirements specification, there may be a more secure code or code with a smaller size. In this case, depending on the user's application, a code that balances performance and security, or performance and code size may be optimal. Then, the verification apparatus 20 may select a predetermined number of bytecodes, in order of performance, from the bytecodes that meet the requirements specification and provide the selected codes to the user. That is, the verification apparatus 20 may output a plurality of recommended codes. Further, in this case, the verification apparatus 20 may provide the user with additional information (details of the options used, code size, etc.) attached to each recommended code. The user may specify the number of bytecodes outputted as recommended codes.

In the third example embodiment, etc., the verification apparatus 20 generates a plurality of bytecodes and the verification environment 40 verifies each bytecode. The verification apparatus 20, however, may generate a single bytecode and a plurality of the verification environments 40 may verify suitability of the bytecode for the requirements specification. That is, with a verification code being fixed, the verification environment 40 suitable for the requirements specification may be searched for. The selected verification environment 40 may be recommended as a "recommended environment" to the user.

In the above example embodiments, in addition to a source code, the requirements specification is entered into the verification apparatus 20, however, an explicit input of a requirements specification may be omitted. For example, when no requirements specification is entered, the verification apparatus 20 may provide a recommended code and a recommended environment, assuming that a requirements specification indicating that "performance prioritized" has been entered.

In the above example embodiments, basically all the processing described in the bytecode is executed for verification of a bytecode in the verification environments 30 and 40. In this verification method, however, it may take a long time to verify one bytecode, depending on contents of multiparty computation. As a result, it may take an enormous amount of time to determine a final recommended code. To eliminate such inconvenience, the verification apparatus 20 may evaluate a bytecode by executing only some of processing described in the bytecode, instead of executing and evaluating all the processing described therein. For example, before compiling a source code, the compilation part 303 modifies a part thereof, and when the main function is executed a predetermined number of times, the compilation part 303 has this notified to outside (as an execution result). The verification apparatus 20 may treat this notification as an execution result and calculate an evaluation index.

Figure 20:
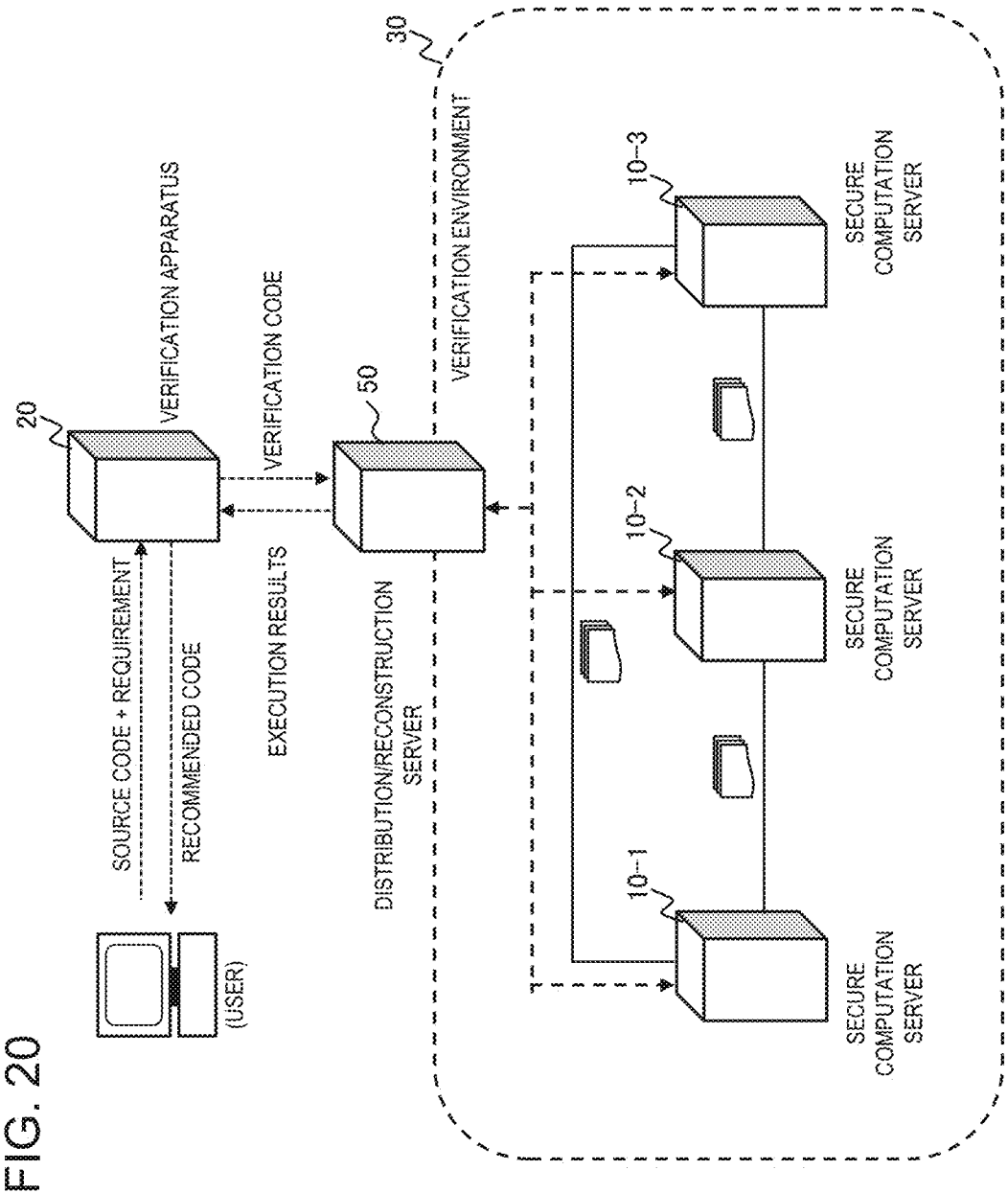
FIG. 20 is a diagram illustrating an example of a schematic configuration of the multiparty computation verification system.

In the above example embodiments, one of a plurality of the secure computation servers 10 is treated as a representative server, which distributes input data to be secret-shared and reconstructs a secret-shared execution result. Instead of this configuration, however, a distribution/reconstruction server that distributes input data to be secret-shared to each secure computation server 10 and reconstructs the execution result secret-shared by the secure computation servers 10 may be incorporated into a system. For example, as illustrated in FIG. 20, a distribution/reconstruction server 50 may be provided. In this case, the verification apparatus 20 may distribute a verification code to each secure computation server 10 via the distribution/reconstruction server 50 or directly distribute it to each server. Further, the verification apparatus 20 may obtain an execution result via the distribution/reconstruction server 50.

As illustrated in FIG. 20, the distribution/reconstruction server 50 can be incorporated into the system. In this case, the compile options may include an option for whether or not to use the distribution/reconstruction server 50. Further, when the compile option to use the distribution/reconstruction server 50 is enabled, a location where the distribution/reconstruction server 50 is installed may be recommended based on the requirements specification from the user. In many cases, the distribution/reconstruction server 50 is assumed to be an honest participant. If the distribution/reconstruction server 50 is a dishonest participant or controlled by a dishonest participant, a value will be known to the dishonest participant before being distributed and confidentiality cannot be achieved. In such a case, since the value can be altered when it is reconstructed, authenticity cannot be achieved, either. Therefore, when the distribution/reconstruction server 50 is installed, it is necessary to consider who installs it where and how it is managed. Here, installation of the distribution/reconstruction server 50 in the user's on-premises environment may offer high security. Such a measure, however, increases a cost and is often avoided by users. On the other hand, if the distribution/reconstruction server 50 is installed in a cloud, a cost will be reduced. However, as long as the cloud service provider manages the distribution/reconstruction server 50, there is a possibility that the cloud service provider will take a peep at input data or tamper with the reconstructed value. In addition, there may be cases where the distribution/reconstruction server 50 is operated by a third party (such as a government). As described above, the installation of the distribution/reconstruction server 50 is closely related to security and cost. Therefore, for example, when the user requirements specification indicates "security prioritized," the verification apparatus 20 recommends installation of the distribution/reconstruction server 50 in the user environment. Alternatively, when the user requirements specification indicates "the cost prioritized," the verification apparatus 20 recommends installation of the distribution/reconstruction server 50 in the cloud environment.

In the above example embodiments, secure computation is executed by means of secret sharing using a plurality of the secure computation servers 10. Secure computation, however, may be performed using homomorphic encryption, fully homomorphic encryption, etc. In this case, the verification environment 30 or 40 should include at least one server. Further, such a difference in the secret sharing scheme may be distinguished by compile options.

In the above example embodiments, each secure computation server 10 is assumed to be realized by a server (physical machine). However, a plurality of the secure computation servers 10 may be realized as virtual machines on a single server. Further, the multiparty computation verification system may include a secure computation server 10 realized by a virtual machine and a secure computation server 10 realized by a physical machine.

In the fifth example embodiment, the number of generated bytecodes is restricted by deselecting some compile options. Such a measure, however, may not be able to obtain a bytecode (recommended code) that meets a user's requirements specification. In this case, the compilation part 303 may select the deselected compile options to increase the number of codes to be verified.

Although a plurality of steps (processes) are described in order in the sequence diagrams used in the above description, an execution order of steps performed in each example embodiment is not limited to the order in the description thereof. In each example embodiment, the order of the illustrated steps can be changed, such as executing the processes in parallel, as long as no substantial problem occurs. Further, the above example embodiments can be combined as long as no substantial conflict with each other arises. That is, any combination of the example embodiments is included as another example embodiment.

One can use a computer as the verification apparatus by installing a multiparty computation executable code verification program to a storage part of the computer. Further, one can execute a method for verifying multiparty computation executable code using a computer by having the computer execute the multiparty computation executable code verification program.

Each disclosure of Patent Literature and Non-Patent Literature cited above is incorporated herein in its entirety by reference thereto. It is to be noted that it is possible to modify or adjust the example embodiments or examples within the whole disclosure of the present invention (including the Claims) and based on the basic technical concept thereof. Further, it is possible to variously combine or select (or partially delete) a wide variety of the disclosed elements (including the individual elements of the individual claims, the individual elements of the individual example embodiments or examples, and the individual elements of the individual figures) within the scope of the whole disclosure of the present invention. That is, it is self-explanatory that the present invention includes any types of variations and modifications to be done by a skilled person according to the whole disclosure including the Claims, and the technical concept of the present invention. Particularly, any numerical ranges disclosed herein should be interpreted that any intermediate values or subranges falling within the disclosed ranges are also concretely disclosed even without specific recital thereof.

What is claimed is:

1. A verification apparatus comprising:
   a processor; and
   a memory storing program instructions executable by the processor to:
   acquire source code for multiparty computation;
   for each of a plurality of combinations of options for a multiparty computation compiler, compile the source code to generate a corresponding one of a plurality of multiparty computation executable codes;
   select at least one verification code from the plurality of multiparty computation executable codes, and provide the at least one verification code to each of a plurality of verification environments of multiparty computation, wherein each verification environment includes a plurality of secure computation servers;
   for each verification environment, generate an evaluation index with respect to an evaluation result of the at least one verification code within the verification environment; and
   select at least one recommended code from the plurality of multiparty computation executable codes, based on the evaluation index for each verification environment, and output the selected at least one recommended code and the verification environment corresponding to the selected at least one recommended code, as a recommended environment.

2. The verification apparatus according to claim 1, wherein information regarding a network in an environment in which multiparty computation is executed is acquired, and
   for each verification environment, the environment in which multiparty computation is executed is simulated by using the information regarding the network.

3. The verification apparatus according to claim 2, wherein providing the at least one verification code to each verification environment and generating the evaluation index are repeated, and
   the at least one verification code corresponding to the evaluation index indicating best performance among evaluation indices is selected as the at least one recommended code.

4. The verification apparatus according to claim 1, wherein the at least one recommended code is selected from the plurality of verification codes based on information regarding performance of multiparty computation.

5. The verification apparatus according to claim 1, wherein a portion of the options are fixed in each combination, based on a requirements specification from a user.

6. The verification apparatus according to claim 1, wherein
   when there is a plurality of the verification environments that for each of which the evaluation index satisfies a first request included in a requirements specification from a user, the the recommended environment is selected from the plurality of verification environments based on a second request included in the requirements specification.

7. The verification apparatus according to claim 1, wherein the program instructions are executable by the processor to further:
   convert the source code into source code processable by the multiparty computation compiler.

8. The verification apparatus according to claim 7, wherein the source code is converted based on setting information regarding multiparty computation, and
   the setting information is rewritten based on the evaluation index for the recommended environment, and the source code is reconverted using the rewritten setting information.

9. The verification apparatus according to claim 7, wherein the options include at least one of:
   an option for a code size indicating whether the code size is prioritized or not prioritized;
   an option for type conversion indicating whether throughput is prioritized or latency is prioritized;
   an option for fixed/floating point accuracy;
   an option for security;
   an option for selection of a multiparty computation method to be used; and
   an option for a level of secret sharing for converting the source code into the source code processable by the multiparty computation compiler.

10. The verification apparatus according to claim 8, wherein the setting information includes:
    information about setting of each verification environment including the plurality of secure computation servers; and
    a plurality of rules used for determining a conversion operation, the plurality of rules including at least one of a rule on conversion processing for a function in the source code, and a rule on conversion processing for a parameter and/or type in the source code.

11. The verification apparatus according to claim 10, wherein the function included in the source code and included in the setting information is replaced with a function for multiparty computation, and the parameter that is included in the source code and that stores data acquired by the function is set as a target of secret sharing.

12. The verification apparatus according to claim 10, wherein depending on the rule on the conversion processing for the parameter, the secret-shared data and one or more parameters affected by the secret-shared data are set as targets of secret-sharing, or all parameters and constants included in the source code are set as the targets of secret-sharing.

13. The verification apparatus according to claim 7, wherein the source code is converted based on setting information regarding multiparty computation, and
    the setting information is rewritten based on a requirements specification, and the source code is reconverted by using the rewritten setting information.

14. The verification apparatus according to claim 1, wherein
    the at least one verification code is provided to each of the plurality of secure computation servers of each verification environment.

15. The verification apparatus according to claim 14, wherein each verification environment includes
    a distribution/reconstruction server connected to the plurality of secure computation servers, wherein the distribution/reconstruction server distributes secret-shared input data to the plurality of secure computation servers, and reconstructs execution results that are secret-shared by the plurality of secure computation servers, and wherein the execution the evaluation result of the at least one verification code is acquired via the distribution/reconstruction server of each verification environment.

16. The verification apparatus according to claim 15, wherein the options include:

an option for whether or not to use the distribution/reconstruction server.

17. A multiparty computation verification system comprising:

a plurality of verification environments that each include a plurality of secure computation servers; and a verification apparatus connected to each verification environment, wherein the verification apparatus comprises:

a processor; and a memory storing program instructions executable by the processor to:

acquire source code for multiparty computation;

for each of a plurality of combinations of options for a multiparty computation compiler, compile the source code to generate a corresponding one of a plurality of multiparty computation executable codes;

select at least one verification code from the plurality of multiparty computation executable codes, and provide the at least one verification code to each verification environment;

for each verification environment, generate an evaluation index with respect to an evaluation result of the at least one verification code within the verification environment; and select at least one recommended code from the plurality of multiparty computation executable codes, based on the evaluation index for each verification environment, and output the selected at least one recommended code and the verification environment corresponding to the selected at least one recommended code, as a recommended environment.

18. A method for verifying multiparty computation executable code, the method comprising:

acquiring, by a processor, a source code for multiparty computation;

for each of a plurality of combinations of options for a multiparty computation compiler, compiling, by the processor, the source code to generate a corresponding one of a plurality of multiparty computation executable codes;

selecting, by the processor, at least one verification code from the plurality of multiparty computation executable codes, and provide the at least one verification code to each of a plurality of verification environments of multiparty computation, wherein each verification environment includes a plurality of secure computation servers;

generating, by the processor, an evaluation index with respect to an evaluation result of the at least one verification code within the verification environment; and selecting, by the processor, at least one recommended code from the plurality of multiparty computation executable codes, based on the evaluation index for each verification environment, and outputting the selected at least one recommended code and the verification environment corresponding to the selected at least one recommended code, as a recommended environment.

19. A non-transitory computer-readable medium storing a program executable by a computer to perform processing comprising:

acquiring a source code for multiparty computation;

for each of a plurality of combinations of options for a multiparty computation compiler, compiling the source code to generate a corresponding one of a plurality of multiparty computation executable codes;

selecting at least one verification code from the plurality of multiparty computation executable codes, and provide the at least one verification code to each of a plurality of verification environments of multiparty computation, wherein each verification environment includes a plurality of secure computation servers;

generating an evaluation index with respect to an evaluation result of the at least one verification code within the verification environment; and selecting at least one recommended code from the plurality of multiparty computation executable codes, based on the evaluation index for each verification environment, and outputting the selected at least one recommended code and the verification environment corresponding to the selected at least one recommended code, as a recommended environment.

* * * * *